(12) United States Patent
Nakajima et al.

(10) Patent No.: US 12,539,032 B2
(45) Date of Patent: Feb. 3, 2026

(54) OPHTHALMIC APPARATUS AND OPHTHALMIC INFORMATION PROCESSING APPARATUS

(71) Applicant: Topcon Corporation, Tokyo (JP)

(72) Inventors: Masashi Nakajima, Ageo (JP); Ryosuke Shimosawa, Tokyo (JP); Shigeru Okikawa, Tokyo (JP)

(73) Assignee: Topcon Corporation, Tokyo (JP)

( * ) Notice: Subject to any disclaimer, the term of this patent is extended or adjusted under 35 U.S.C. 154(b) by 393 days.

(21) Appl. No.: 18/118,132

(22) Filed: Mar. 7, 2023

(65) Prior Publication Data

US 2024/0049962 A1 Feb. 15, 2024

(30) Foreign Application Priority Data

Aug. 10, 2022 (JP) .................. 2022-127720

(51) Int. Cl.
*A61B 3/10* (2006.01)
*A61B 3/00* (2006.01)

(52) U.S. Cl.
CPC .............. *A61B 3/10* (2013.01); *A61B 3/0025* (2013.01); *A61B 3/0008* (2013.01)

(58) Field of Classification Search
CPC ....... A61B 3/0008; A61B 3/0025; A61B 3/10; A61B 3/12; A61B 3/14; A61B 3/156
See application file for complete search history.

(56) References Cited

U.S. PATENT DOCUMENTS

| 7,831,106 | B2 | 11/2010 | Elsner et al. |
| 8,237,835 | B1 | 8/2012 | Muller |
| 2015/0085252 | A1 | 3/2015 | Fujimura et al. |
| 2016/0345822 | A1 | 12/2016 | Fujimura et al. |
| 2022/0400948 | A1 | 12/2022 | Takahashi et al. |

FOREIGN PATENT DOCUMENTS

| JP | 61-293430 A | 12/1986 |
| JP | 2010-259495 A | 11/2010 |
| JP | 2013-248376 A | 12/2013 |
| JP | 2021-142172 A | 9/2021 |

*Primary Examiner* — Jack Dinh
(74) *Attorney, Agent, or Firm* — XSENSUS LLP

(57) ABSTRACT

An ophthalmic apparatus includes an objective lens, an illumination optical system, an imaging optical system, and an optical path coupling member. The illumination optical system may illuminate a subject's eye with illumination light via the objective lens. The imaging optical system may guide returning light of the illumination light from the subject's eye to an imaging device via the objective lens. The optical path coupling member has a transparent member with a reflective region formed by evaporating a reflective film onto a part of a transmission region of its surface, and is configured to couple an optical path of the illumination optical system with an optical path of the imaging optical system. The transmission region may be arranged substantially conjugate optically to a subject's iris. The illumination light is reflected on the reflective region and the returning light is transmitted through the transmission region.

9 Claims, 12 Drawing Sheets

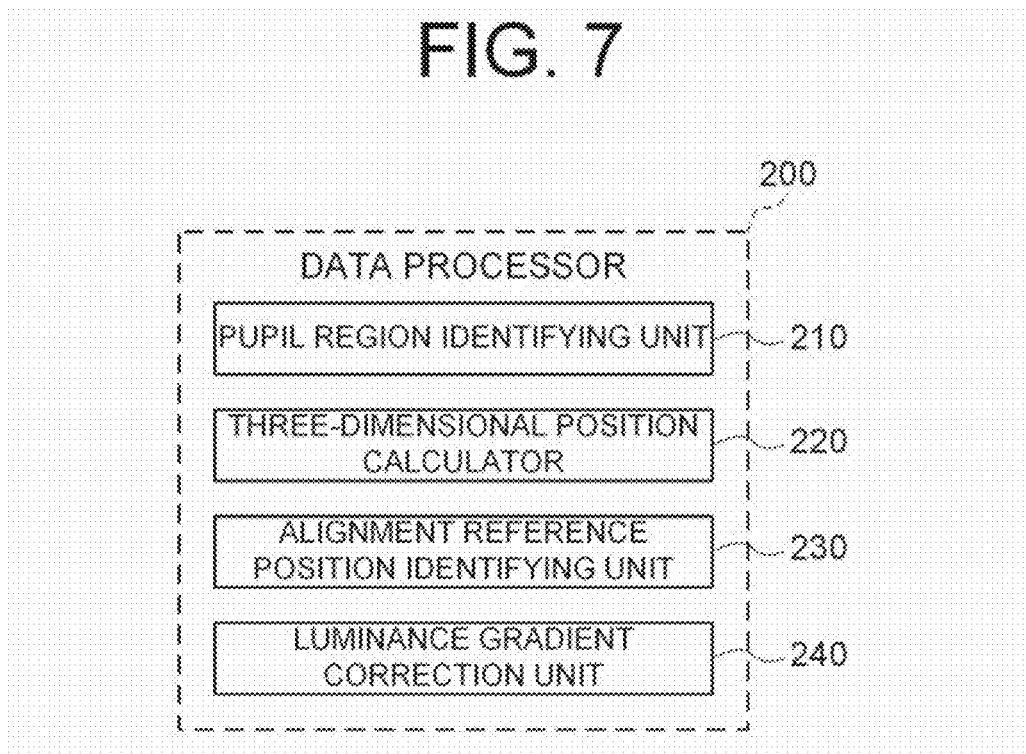
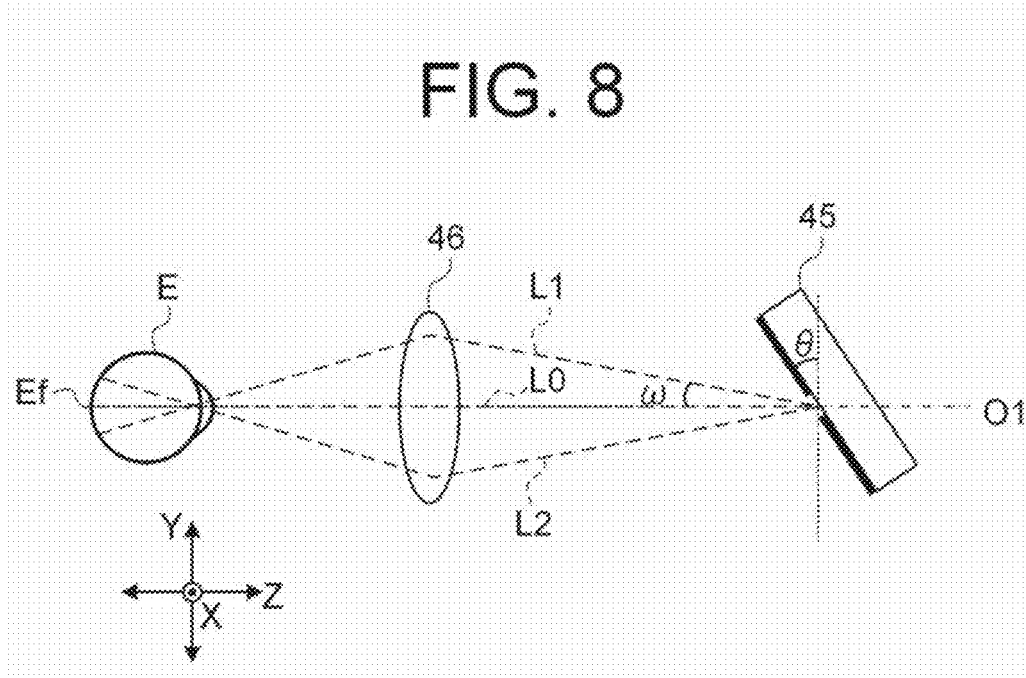

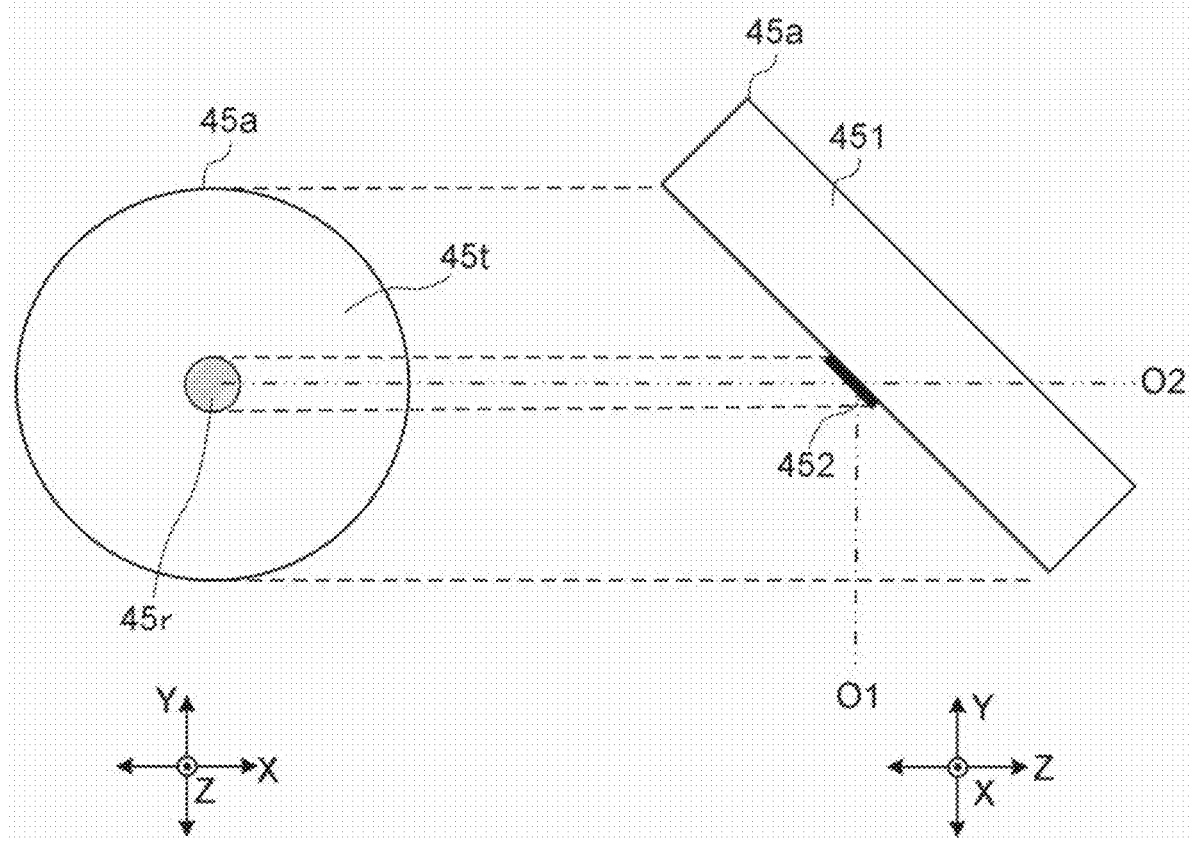

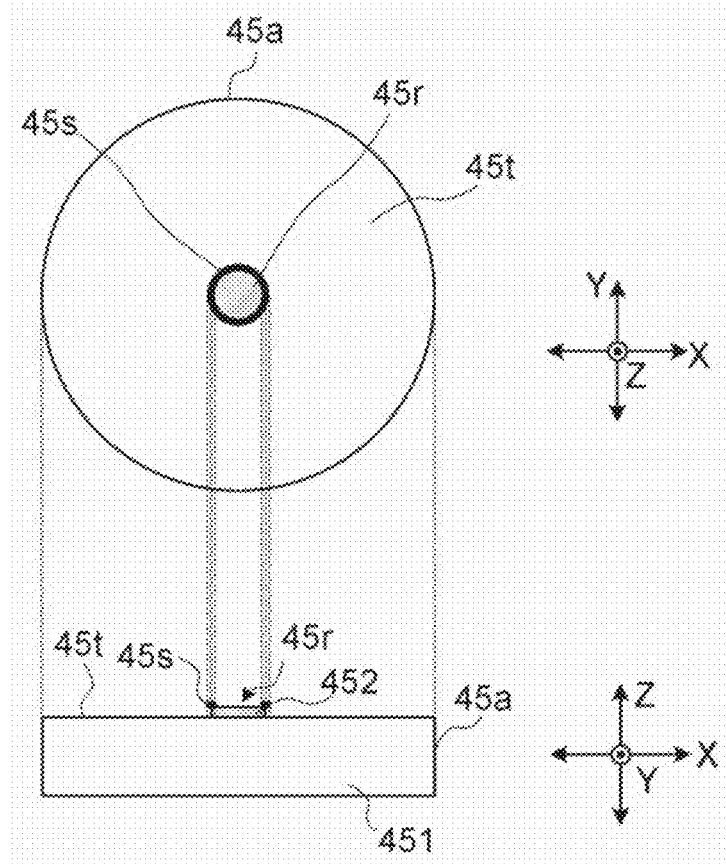

OPHTHALMIC APPARATUS AND OPHTHALMIC INFORMATION PROCESSING APPARATUS

CROSS-REFERENCE TO RELATED APPLICATION

This application is based upon and claims the benefit of priority from Japanese Patent Application No. 2022-127720, filed Aug. 10, 2022: the entire contents of which are incorporated herein by reference.

FIELD

The disclosure relates an ophthalmic apparatus and an ophthalmic information processing apparatus.

BACKGROUND

A fundus camera that photographs a fundus of a subject's eye includes an illumination optical system for illuminating the fundus with illumination light and an imaging optical system for guiding returning light of the illumination light from the subject's eye to an imaging device, and is configured to acquire a fundus image by receiving the returning light from the fundus illuminated with illumination light.

In such ophthalmic apparatuses, when reflected light or scattered light of the illumination light from a cornea or a crystalline lens is guided to the imaging device, which can be a cause of flare. Therefore, in ophthalmic apparatuses, pupil division may be performed to divide the aperture of the illumination optical system and the aperture of the imaging optical system using a pupil dividing member as an optical path coupling member placed at a position substantially conjugate optically to a pupil (iris) of the subject's eye (for example, Japanese Unexamined Patent Application Publication No. 2021-142172).

The pupil division member has a transmission region that transmits light and a reflective region that reflects light. The ophthalmic apparatuses perform pupil division by placing any one of the transmission region and the reflective region provided on the pupil division member on each of the optical paths of the illumination light and the returning light of the illumination light.

SUMMARY

One aspect of embodiments is an ophthalmic apparatus, including: an objective lens; an illumination optical system configured to illuminate a subject's eye with illumination light via the objective lens; an imaging optical system configured to guide returning light of the illumination light from the subject's eye to an imaging device via the objective lens; and an optical path coupling member having a transparent member with a reflective region formed by evaporating a reflective film onto a part of a transmission region of its surface, and configured to couple an optical path of the illumination optical system with an optical path of the imaging optical system. The transmission region is configured to be capable of being arranged at a position substantially conjugate optically to an iris of the subject's eye. The illumination optical system and the imaging optical system are arranged so that the illumination light is reflected on the reflective region and the returning light is transmitted through the transmission region.

Another aspect of the embodiments is an ophthalmic apparatus, including: an objective lens; an illumination optical system configured to illuminate a subject's eye with illumination light via the objective lens; an imaging optical system configured to guide returning light of the illumination light from the subject's eye to an imaging device via the objective lens; and an optical path coupling member having a transparent member with a reflective region formed by evaporating a reflective film onto a part of a transmission region of its surface, and configured to couple an optical path of the illumination optical system with an optical path of the imaging optical system. The reflective region is configured to be capable of being arranged at a position substantially conjugate optically to an iris of the subject's eye. The illumination optical system and the imaging optical system are arranged so that the illumination light is transmitted through the transmission region and the returning light is reflected on the reflective region.

Still another aspect of the embodiments is an ophthalmic information processing apparatus, including: an acquisition unit configured to acquire a photographic image using an any one of the above ophthalmic apparatus; a luminance gradient correction unit configured to correct a luminance gradient in a first direction perpendicular to an optical axis of the objective lens in the photographic image acquired by the acquisition unit, when the transmission region on the surface is arranged to be tilted in the first direction.

BRIEF DESCRIPTION OF THE DRAWINGS

FIG. 7 is a functional block diagram illustrating an example of a configuration of a control system of the ophthalmic apparatus according to the first embodiment.

FIG. 8 is a schematic diagram for explaining an operation of the ophthalmic apparatus according to the first embodiment.

FIG. 15 is a schematic diagram for explaining a configuration of the perforated mirror according to the second embodiment.

FIG. 16 is a schematic diagram for explaining a configuration of the perforated mirror according to a modification example of the second embodiment.

DETAILED DESCRIPTION

Figure 1:
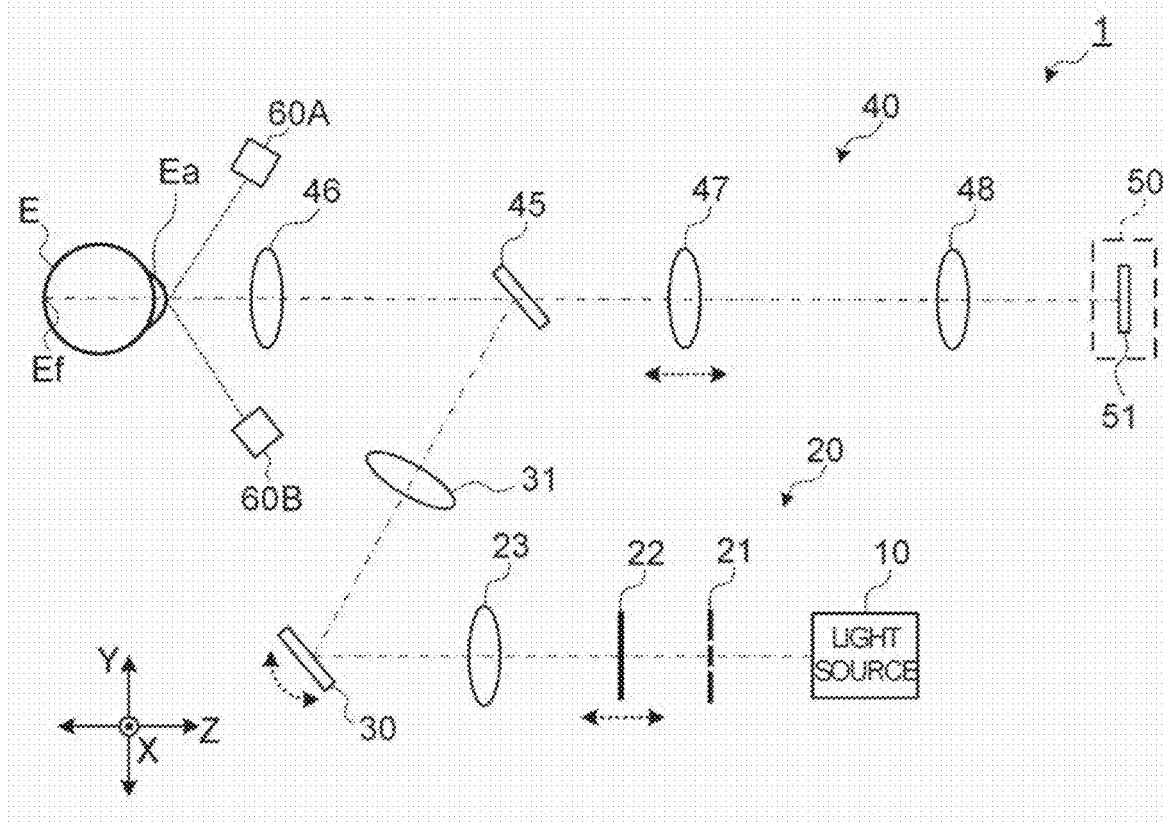
FIG. 1 is a schematic diagram illustrating an example of a configuration of an optical system of an ophthalmic apparatus according to a first embodiment.

Among unnecessary light included in the returning light from a subject's eye, the intensity of the corneal reflected light component is the strongest. When the pupil division member has a portion (edge, end face) with a predetermined thickness in a direction along an optical path of transmitted light (optical axis direction of an imaging optical system), the corneal reflected light shines on this portion and is guided to the imaging optical system as the reflected light or the scattered light, which is a caused of flare.

According to some embodiments of the present invention, a new technique for reducing flare while performing pupil division between the illumination optical system and the imaging optical system can be provided.

Referring now to the drawings, exemplary embodiments of an ophthalmic apparatus and an ophthalmic information processing apparatus according to the present invention are described below. The contents of the document cited in the present specification can be appropriately incorporated as contents of the following embodiments.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An ophthalmic apparatus according to embodiments includes an objective lens, an illumination optical system, and an imaging (photographing) optical system. The illumination optical system is configured to illuminate the subject's eye with illumination light via the objective lens. The imaging optical system is configured to guide returning light of the illumination light from the subject's eye to an imaging device (including an image sensor) via the objective lens. The ophthalmic apparatus includes an optical path coupling member. The optical path coupling member is configured to couple an optical path of the illumination optical system with an optical path of the imaging optical system. The optical path coupling member has a transparent member that can be a transmission region. On a surface of the transparent member, a reflective region is formed by evaporating a reflective film onto a part of the transmission region.

In some embodiments, the transmission region formed in the optical path coupling member can be arranged at a position substantially conjugate optically to an iris (pupil) of the subject's eye. In this case, the illumination optical system and the imaging optical system are arranged so that the illumination light is reflected on the reflective region and the returning light is transmitted through the transmission region. In other words, the illumination optical system is positioned in a reflection direction of the optical path coupling member, and the imaging optical system is positioned in a transmission direction of the optical path coupling member.

In some embodiments, the reflective region formed on the optical path coupling member can be arranged at a position substantially conjugate optically to an iris of the subject's eye. In this case, the illumination optical system and the imaging optical system are arranged so that the illumination light is transmitted through the transmission region and the returning light is reflected on the reflective region. In other words, the illumination optical system is positioned in the transmission direction of the optical path coupling member, and the imaging optical system is positioned in the reflection direction of the optical path coupling member.

The reflective film may be a metal film or a dielectric multi-layer film. Such reflective film is formed by evaporating (mirror-depositing) a metal film onto the surface of the transparent member as a base substance or formed by evaporating a dielectric substance on multiple layers on the surface of the transparent member. The transparent member may be a transparent glass member, a transparent plastic member, or the like.

This enables to substantially eliminate the portion having a thickness in the direction along the optical path of the transmitted light transmitted through the optical path coupling member (in the optical axis direction of the imaging optical system), or significantly reduce the thickness of the portion. As a result, the occurrence of flare caused by the reflected light of the portion that is guided to the imaging optical system can be suppressed.

Further, when the optical system is arranged so that the transmission direction of the optical path coupling member does not coincide with an opposite direction of the reflection direction, the transmitted light (illumination light or returning light) enters at an angle to the transmission region formed in the optical path coupling member. In other words, the incident angle of the transmitted light does not coincide with the normal direction of the transmission region (surface). In this case, the light amount of the transmitted light irradiated onto the image sensor or the subject's eye varies in one direction, and the image of the subject's eye acquired using the image sensor has a luminance gradient in one direction. An ophthalmic information processing apparatus according to some embodiments includes a communication unit not shown in the figure, and performs correction processing of the luminance gradient in one direction on the image of the subject's eye acquired by the ophthalmic apparatus described above via the communication unit. In some embodiments, the ophthalmic apparatus has the function of the ophthalmic information processing apparatus according to the embodiments.

A method of controlling the ophthalmic apparatus according to the embodiments includes one or more steps for realizing the processing executed by a processor (computer) in the ophthalmic apparatus according to the embodiments. An ophthalmic information processing method according to the embodiments includes one or more steps for realizing the processing executed by a processor (computer) in the ophthalmic information processing apparatus according to the embodiments. A program according to the embodiments causes the processor to execute each step of the method of controlling the ophthalmic apparatus or the ophthalmic information processing method according to the embodiments. A recording medium (storage medium) according to the embodiments is a computer readable non-transitory recording medium (storage medium) on which the program according to the embodiments is recorded.

The term "processor" as used herein refers to a circuit such as, for example, a central processing unit (CPU), a graphics processing unit (GPU), an application specific integrated circuit (ASIC), and a programmable logic device (PLD). Examples of PLD include a simple programmable logic device (SPLD), a complex programmable logic device (CPLD), and a field programmable gate array (FPGA). The processor realizes, for example, the function according to the embodiments by reading out a computer program stored in a storage circuit or a storage device and executing the computer program.

Hereinafter, the case will be described in which the ophthalmic apparatus according to the embodiments photographs the fundus using a slit scan method. However, the configuration of the ophthalmic apparatus according to the embodiments is not limited thereto.

First Embodiment

<Ophthalmic Apparatus>

An ophthalmic apparatus according to a first embodiment is configured to illuminate a fundus of a subject's eye while moving an irradiated position (irradiated range) of slit-shaped illumination light, and to receive returning light from the fundus using an image sensor with a one-dimensional or two-dimensional array of light receiving elements. Light receiving result of the returning light is read out from the light receiving element(s) at light receiving position of the returning light corresponding to the irradiated position of the illumination light, in synchronization with the movement timing of the irradiated position of the illumination light. In the first embodiment, the illumination optical system is positioned in a reflection direction of a perforated mirror as the optical path coupling member, and the imaging optical system is positioned in a transmission direction of the perforated mirror.

[Configuration of Optical System]

FIG. 1 illustrates an example of a configuration of an optical system of the ophthalmic apparatus according to the first embodiment. In FIG. 1, for convenience of explanation, a left/right direction (i.e., horizontal direction) orthogonal to an optical axis of the optical system (imaging optical system) is regarded as the X direction, a up/down direction (i.e., vertical direction) orthogonal to the optical axis of the optical system is regarded as the Y direction, and the optical axis direction (i.e., front/back direction, working distance direction) of the optical system is regarded as the Z direction.

The ophthalmic apparatus 1 according to the first embodiment includes a light source 10, an illumination optical system 20, an optical scanner 30, an imaging optical system 40, and an imaging device 50. In some embodiments, the illumination optical system 20 includes at least one of the light source 10 or the optical scanner 30 (or the optical scanner 30 and a relay lens 31 described below). In some embodiments, the imaging optical system 40 includes the imaging device 50. Hereinafter, it is assumed that the illumination optical system 20 includes the light source 10.

(Light Source 10)

The light source 10 includes a visible light source that generates light in the visible region. For example, the light source 10 generates light having a central wavelength in the wavelength range of 420 nm to 700 nm. This type of light source 10 includes, for example, an LED (Light Emitting Diode), an LD (Laser Diode), a halogen lamp, or a xenon lamp. In some embodiments, the light source 10 includes an infrared light source (near-infrared light source) that generates light in the infrared region (near-infrared region). In some embodiments, the light source 10 includes a white light source or a light source capable of outputting light with each color component of RGB. In some embodiments, the light source 10 includes a light source capable of switching to output the light in infrared region or the light in visible region. The light source 10 is arranged at a position non-conjugate optically to the fundus Ef and the iris, respectively.

(Illumination Optical System 20)

The illumination optical system 20 generates slit-shaped illumination light using the light from the light source 10. The illumination optical system 20 guides the generated illumination light to the optical scanner 30.

The illumination optical system 20 includes an iris aperture 21, a slit (slit aperture diaphragm) 22, and a relay lens 23. The light from the light source 10 passes through the aperture(s) formed in the iris aperture 21, passes through the aperture formed in the slit 22, and is transmitted through the relay lens 23. The relay lens 23 includes one or more lenses. The light transmitted through the relay lens 23 is guided to the optical scanner 30.

(Iris Aperture 21)

The iris aperture 21 (specifically, aperture(s) described below) can be arranged at a position substantially conjugate optically to the iris (pupil) of a subject's eye E. In the iris aperture 21, one or more apertures are formed at position(s) away from an optical axis of the illumination optical system 20. For example, two apertures having a predetermined thickness along a circumferential direction centered with the optical axis are formed in the iris aperture 21. The aperture formed in the iris aperture 21 defines an incident position (incident shape) of the illumination light on the iris of the subject's eye E. For example, by forming the two apertures at the positions away from the optical axis of the illumination optical system 20, when the pupil center of the subject's eye E is arranged on the optical axis of the illumination optical system 20, the illumination light can enter into the eye from positions deviated from the pupil center (specifically, point-symmetrical positions centered on the pupil center), In some embodiments, an optical element for deflecting the light from the light source 10 is positioned so that the light amount distribution in a direction connecting the aperture formed in the iris aperture 21 and an aperture formed in the slit 22 is maximized.

Further, the light amount distribution of the light passing through the aperture(s) formed in the iris aperture 21 can be changed by changing a relative position between the light source 10 and the aperture(s) formed in the iris aperture 21.

(Slit 22)

The slit 22 (specifically, aperture(s) described below) can be arranged at a position substantially conjugate optically to the fundus Ef of the subject's eye E. For example, in the slit 22, the aperture is formed extending in a direction corresponding to a line direction (row direction) that is read out from the image sensor 51 described below using the rolling shutter method. The aperture formed in the slit 22 defines an irradiated pattern of the illumination light on the fundus Ef of the subject's eye E. The direction in which the aperture formed in the slit 22 extends may be described as a slit direction.

The slit 22 can be moved in the optical axis direction of the illumination optical system 20 using a movement mechanism (movement mechanism 22D described below). The movement mechanism moves the slit 22 in the optical axis direction, under the control from the controller 100 described below. For example, the controller 100 described below controls the movement mechanism in accordance with the state of the subject's eye E. This allows to move the position of the slit 22 in accordance with a state of the subject's eye E (specifically, the dioptric power (diopter scale) or the shape of the fundus Ef).

The light from the light source 10 that has passed through the aperture(s) formed in the iris aperture 21 is output as the slit-shaped illumination light by passing through the aperture formed in the slit 22. The slit-shaped illumination light is transmitted through the relay lens 23, and is guided to the optical scanner 30. For example, the slit 22 generates the slit-shaped illumination light parallel to the X direction at the fundus Ef (or fundus conjugate position) in the focused state. In this case, the optical scanner 30 deflects the generated slit-shaped illumination light in the Y direction at the fundus Ef (or fundus conjugate position) in the focused state.

(Optical Scanner 30)

The optical scanner 30 is placed at a position substantially conjugate optically to the iris of the subject's eye E. The optical scanner 30 deflects the slit-shaped illumination light transmitted through the relay lens 23 (slit-shaped light passing through the aperture formed in the slit 22). Specifically, the optical scanner 30 guides the slit-shaped illumination light for sequentially illuminating a predetermined illumination range of the fundus Ef to the perforated mirror 45 described below, while deflecting the slit-shaped illumination light within a predetermined deflection angle range with the iris of the subject's eye E or its vicinity as the scan center position. The optical scanner 30 can deflect the illumination light one-dimensionally or two-dimensionally.

In case that the optical scanner 30 deflects the illumination light one-dimensionally, the optical scanner 30 includes a galvano scanner that deflects the illumination light within a predetermined deflection angle range with reference to a predetermined deflection direction. The galvano scanner deflects the illumination light so that the slit-shaped illumination light irradiated on the fundus Ef moves in a direction that intersects the slit direction.

In case that the optical scanner 30 deflects the illumination light two-dimensionally, the optical scanner 30 includes a first galvano scanner and a second galvano scanner. The first galvano scanner deflects the illumination light so as to move the irradiated position of the illumination light in a horizontal direction orthogonal to the optical axis of the illumination optical system 20. The second galvano scanner deflects light deflected by the first galvano scanner so as to move the irradiated position of the illumination light in a vertical direction orthogonal to the optical axis of the illumination optical system 20.

A relay lens 31 is arranged between the optical scanner 30 and the perforated mirror 45. The relay lens 31 includes one or more lenses.

In some embodiments, at least one of a black dot or a focus indicator optical system is placed between the optical scanner 30 and the perforated mirror 45.

The black dot is arranged at a position substantially conjugate optically to a position of a center ghost formed by reflection of the illumination light on the lens surface of the objective lens 46 described below.

The focus indicator optical system projects focus indicator(s) onto the fundus Ef of the subject's eye E, when focus control is performed. Light (focus indicator light) output from the focus indicator optical system is projected onto the fundus Ef of the subject's eye E. Fundus reflection light of the focus indicator light is transmitted through a transmission region formed in the perforated mirror 45, and is detected by the image sensor 51 in the imaging device 50. Light receiving image (split indicators) captured by the image sensor 51 is displayed on a display means not shown in the figure. For example, the controller 100 described below analyzes the position(s) of the split indicator(s) according to the Scheiner principle, and moves each of the focusing lens 47 and the focus indicator optical system, which are described below, in the optical axis direction to perform focusing (automatic focus function). Alternatively, the user may perform focusing manually while visually checking the split indicators.

(Imaging Optical System 40)

The imaging optical system 40 guides the illumination light deflected by the optical scanner 30 to the fundus Ef of the subject's eye E, and also guides the returning light of the illumination light from the fundus Ef to the imaging device 50.

In the imaging optical system 40, an optical path of the illumination light from the optical scanner 30 and an optical path of the returning light of the illumination light from the fundus Ef are coupled. By using the perforated mirror 45 as an optical path coupling member to couple these optical paths, pupil division between the illumination light and the returning light of the illumination light can be performed.

The imaging optical system 40 includes the perforated mirror 45, the objective lens 46, the focusing lens 47, and a lens 48. The lens 48 includes one or more lenses.

(Perforated Mirror 45)

In the perforated mirror 45, a transmission region and a reflective region are formed on a surface of the transparent member. The transmission region functions as a hole arranged on the optical axis of the imaging optical system 40. The transmission region formed in the perforated mirror 45 can be arranged at a position substantially conjugate optically to the iris of the subject's eye E. In the perforated mirror 45, the reflective region is formed in a peripheral region of the transmission region as the hole. The illumination light from the optical scanner 30 (relay lens 31) is reflected on the reflective region of the perforated mirror 45 toward the objective lens 46.

That is, the perforated mirror 45 is configured to couple the optical path of the illumination optical system 20 (optical path from the optical scanner 30) with the optical path of the imaging optical system 40 arranged in the optical axis direction passing through the transmission region, and also to guide the illumination light reflected on the reflective region formed in the peripheral region of the transmission region to the fundus Ef.

In FIG. 1, a surface of the reflective region of the perforated mirror 45 is arranged to be tilted relative to the optical axis of the imaging optical system 40 so that the illumination optical system 20 is arranged in the reflection direction of the perforated mirror 45 and that the imaging optical system 40 is arranged in the transmission direction of the perforated mirror 45.

(Focusing Lens 47)

The focusing lens 47 can be moved in an optical axis direction of the imaging optical system 40 using a movement mechanism (not shown). The movement mechanism moves the focusing lens 47 in the optical axis direction under the control from the controller 100 described below. This allows to image the returning light of the illumination light passing through the transmission region of the perforated mirror 45 on the light receiving surface of the image sensor 51 in the imaging device 50 in accordance with the state of the subject's eye E.

In the imaging optical system 40 with this configuration, the illumination light (or focus indicator light) from the optical scanner 30 is reflected toward the objective lens 46 on the reflective region formed in the peripheral region of the transmission region (hole) formed in the perforated mirror 45. The illumination light reflected on the reflective region of the perforated mirror 45 is refracted by the objective lens 46, enters into the eye through the pupil of the subject's eye E, and illuminates the fundus Ef of the subject's eye E. In addition, for example, the focus indicator light reflected on the reflective region of the perforated mirror 45 is refracted by the objective lens 46, enters into the eye through the pupil of the subject's eye E, and is projected onto the fundus Ef of the subject's eye E.

The returning light of the illumination light from the fundus Ef (or fundus reflection light of the focus indicator light) is refracted by the objective lens 46, passes through the transmission region of the perforated mirror 45, is transmitted through the focusing lens 47, and is imaged on the light receiving surface of the image sensor 51 in the imaging device 50 through the lens 48.

(Imaging Device 50)

The imaging device 50 includes the image sensor 51 receiving the returning light of the illumination light that has been guided from the fundus Ef of the subject's eye E through the imaging optical system 40. The imaging device 50 can perform readout control of the light receiving result of the returning light under the control from the controller 100 described below.

(Image Sensor 51)

The image sensor 51 realizes the function as a pixelated photodetector. The light receiving surface (detecting surface, imaging surface) of the image sensor 51 can be arranged at a position substantially conjugate optically to the fundus Ef.

The light receiving result(s) obtained using the image sensor 51 is/are read out using a rolling shutter method under the control from the controller 100 described below.

The image sensor 51 with this configuration includes the CMOS image sensor. In this case, the image sensor 51 includes a plurality of pixels (light receiving elements). The plurality of pixels includes a plurality of pixel groups arranged in a column direction. Each of the plurality of pixel groups includes pixels arranged in a row direction. Specifically, the image sensor 51 includes a plurality of pixels arranged two-dimensionally, a plurality of vertical signal lines, and a horizontal signal line. Each pixel includes a photodiode (light receiving element), and a capacitor. The vertical signal lines are provided for each pixel group in the column direction (vertical direction) orthogonal to the row direction (horizontal direction). Each of the vertical signal lines is selectively electrically connected to the pixel group in which the electrical charge corresponding to the light receiving result is accumulated. The horizontal signal line is selectively electrically connected to the vertical signal lines. Each of the pixels accumulates the electrical charge corresponding to the light receiving result of the returning light. The accumulated electrical charge is read out sequentially for each pixel group in the row direction, for example. For example, for each line in the row direction, a voltage corresponding to the electrical charge accumulated in each pixel is supplied to the vertical signal line. The vertical signal lines are selectively electrically connected to the horizontal signal line. By performing readout operation for each line in the row direction described above sequentially in the vertical direction, the light receiving results of the plurality of pixels arranged two-dimensionally can be read out.

By capturing (reading out) the light receiving results of the returning light using the rolling shutter method for this type of image sensor 51, the light receiving image corresponding to the desired virtual opening shape extending in the row direction is acquired. Such control is disclosed in, for example, U.S. Pat. Nos. 7,831,106, 8,237,835, and the like.

Figure 2:
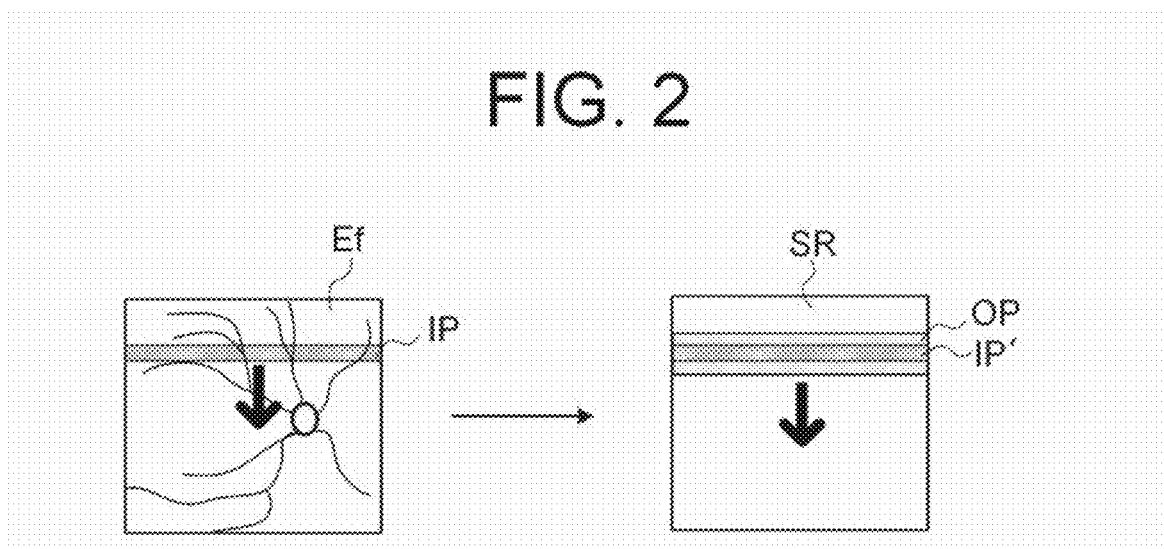
FIG. 2 is a schematic diagram for explaining an operation of the ophthalmic apparatus according to the first embodiment.

FIG. 2 shows a diagram describing the operation of the ophthalmic apparatus 1 according to the first embodiment. FIG. 2 schematically represents an irradiated range IP of the slit-shaped illumination light irradiated on the fundus Ef and a virtual opening range OP on the light receiving surface SR of the image sensor 51.

For example, the controller 100 described below deflects the slit-shaped illumination light formed by the illumination optical system 20, using the optical scanner 30. Thereby, the irradiated range IP of the slit-shaped illumination light is sequentially moved in a direction (for example, the vertical direction) orthogonal to the slit direction (for example, the row direction, the horizontal direction) on the fundus Ef.

On the light receiving surface SR of the image sensor 51, by changing the pixels to be read out in units of lines by the controller 100 described below, the virtual opening range OP is set. The opening range OP is preferable to be the light receiving range IP' of the returning light of the illumination light on the light receiving surface SR or wider than the light receiving range IP'. The controller 100 described below performs the movement control of the opening range OP in synchronization with the movement control of the irradiated range IP of the illumination light. Thereby, without being affected by unnecessary scattered light, high quality images of the fundus Ef with strong contrast can be acquired using a simple configuration.

In some embodiments, the image sensor 51 is configured using one or more line sensors.

In some embodiments, the imaging optical system 40 described below includes an optical element such as a correction lens that can be inserted into and removed from an optical path of the returning light in accordance with the wavelength range (central wavelength) of the light emitted from the light source 10, in order to image the returning light from the subject's eye on an imaging surface of the image sensor 51 in the imaging device 50 in the focused state regardless of the wavelength range (center wavelength) of the returning light from the subject's eye E.

Furthermore, the ophthalmic apparatus 1 can be provided with two or more anterior segment cameras that can be used to perform position matching of the optical system (illumination optical system 20 and imaging optical system 40) with respect to the subject's eye E. In some embodiments, one of the two or more anterior segment cameras is the image sensor 51. In the first embodiment, the ophthalmic apparatus 1 includes anterior segment cameras 60A and 60B.

(Anterior Segment Cameras 60A and 60B)

The anterior segment cameras 60A and 60B are used for obtaining relative position between the optical system of the ophthalmic apparatus 1 and the subject's eye E in the same manner as the method disclosed in Japanese Unexamined Patent Application Publication No. 2013-248376, for example. The anterior segment cameras 60A and 60B are provided on a surface of the subject's eye E side of a body, in which the optical system is housed, of the ophthalmic apparatus 1. The anterior segment cameras 60A and 60B are provided at positions away from the optical axis of the imaging optical system 40, and photographs an anterior segment Ea of the subject's eye E from different directions. The ophthalmic apparatus 1 obtains a three-dimensional relative position between the optical system and the subject's eye E, by analyzing two anterior segment images acquired substantially simultaneously from different directions by the anterior segment cameras 60A and 60B. The analysis of the two anterior segment images may be the same as the analysis disclosed in Japanese Unexamined Patent Application Publication No. 2013-248376.

In the present examples, the position of the subject's eye E (that is, the relative position between the subject's eye E and the optical system) is obtained using two or more anterior segment cameras. However, a method of obtaining the position of the subject's eye E is not limited to this. For example, the position of the subject's eye E can be obtained by analyzing the front image (for example, the observation image of the anterior segment Ea) of the subject's eye E. Alternatively, means for projecting an indicator onto a cornea of the subject's eye E can be provided. Thereby, the position of the subject's eye E can be obtained based on the projected position of this indicator (that is, the detection state of the corneal reflected light flux of this indicator).

In the ophthalmic apparatus having the above configuration, the perforated mirror 45 realizes the functions of the optical path coupling member and the imaging (shooting) aperture by forming the reflective film on a part of the transmission region on the surface of the transparent member.

Here, a comparative example of the embodiments will be described for comparison with the perforated mirror 45 according to the embodiments.

Figure 3:
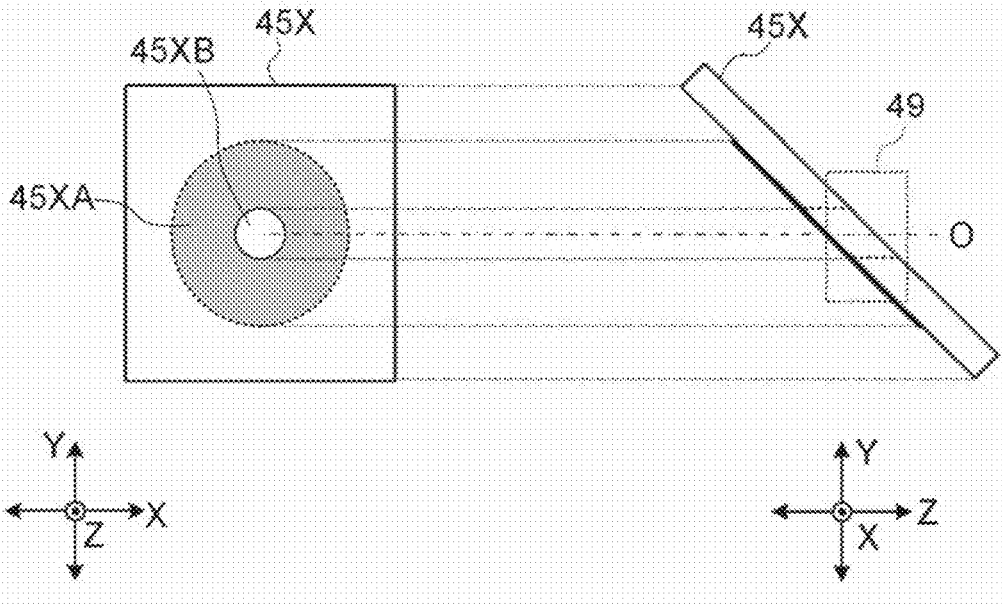
FIG. 3 is a schematic diagram for explaining a configuration of a perforated mirror according to a comparative example of the first embodiment.

FIG. 3 shows a schematic diagram of a configuration of a perforated mirror 45X according to the comparative example of the embodiments. FIG. 3 schematically represents a front view of the perforated mirror 45X when viewed from the optical axis O of the imaging optical system and a side view of the perforated mirror 45X corresponding to the front view.

In the perforated mirror 45X, a hole 45XB passing through an optical axis O of the imaging optical system is formed. In a peripheral region of the hole 45XB, a reflective region 45XA is formed by mirror deposition or other means. In order to reduce the size of the optical system while placing both the perforated mirror 45X and the imaging aperture 49 at positions substantially conjugate optically to the iris of the subject's eye, the imaging aperture 49 is placed in the hole 45XB.

Figure 4:
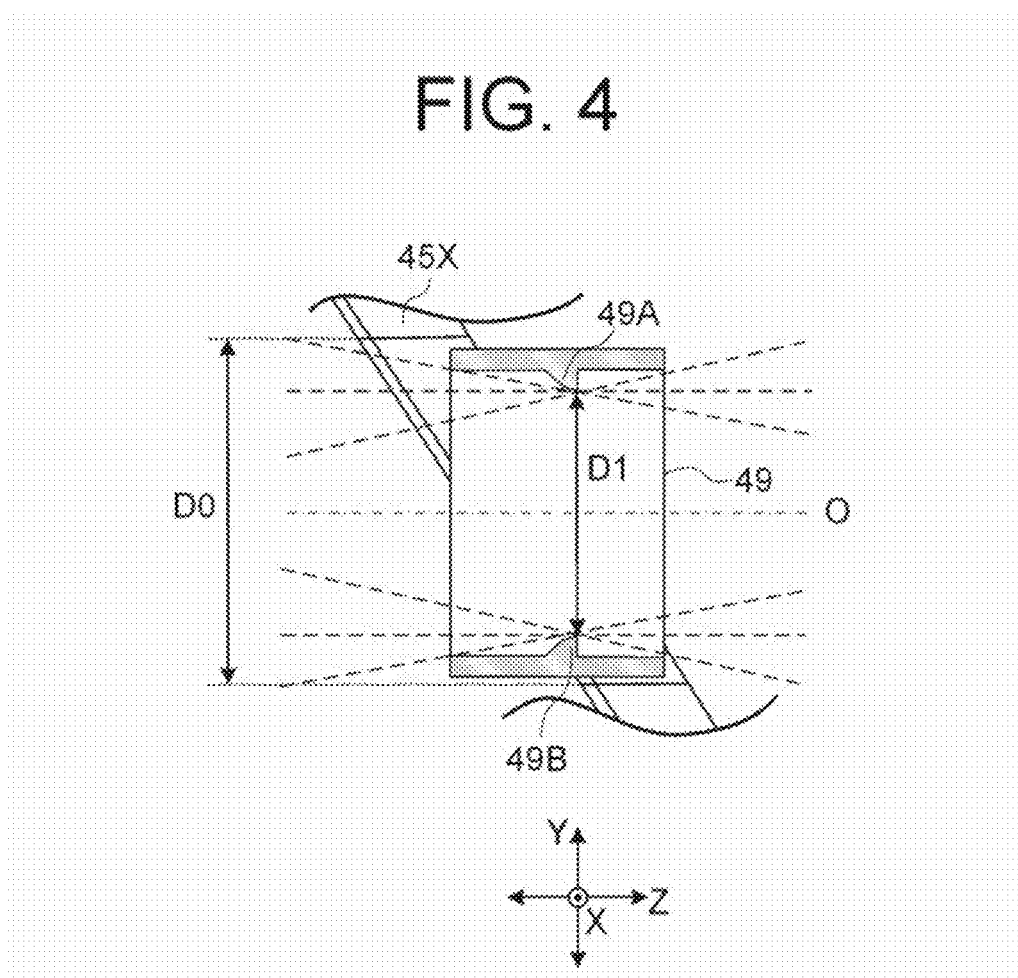
FIG. 4 is a schematic diagram for explaining a configuration of the perforated mirror according to the comparative example of the first embodiment.

FIG. 4 schematically shows the cross-sectional structure of the imaging aperture 49 placed in the hole 45XB of perforated mirror 45X. In FIG. 4, parts similar to those in FIG. 3 are denoted by the same reference symbols, and description thereof is appropriate.

The perforated mirror 45X has the hole 45XB with a hole diameter D0 along the direction of the optical axis O. An antireflection treatment (for example, black coating treatment) is performed on an inner wall surface of the hole 45XB. The imaging aperture 49 is arranged in such the hole 45XB. An aperture (opening) having an imaging aperture diameter D1 (0<D1<D0) is formed in the imaging aperture 49 by cutting and processing. The inner wall surface of the imaging aperture 49, through which the returning light of the illumination light passes, is also performed on the antireflection treatment.

When such the perforated mirror 45X is applied to the ophthalmic apparatus 1 shown in FIG. 1, the illumination light is reflected on the reflective region 45XA and is guided to the subject's eye E, and the returning light from the subject's eye E passes through the hole 45XB and is guided to the imaging device 50.

When forming an aperture (diaphragm) having the imaging aperture diameter D1 by cutting and processing, the thickness of convex portions 49A and 49B in the direction along the optical path of the returning light is limited to about 0.2 mm. Moreover, when the antireflection treatment is performed on the inner wall surface of the imaging aperture 49, the thickness of the convex portions 49A and 49B in the direction along the optical path of the returning light is thicker than the thickness that can be machined with cutting accuracy. When the corneal reflected light included in the returning light shines on the convex portions 49A and 49B having such thicknesses, the returning light is guided to the imaging optical system and becomes a cause of the occurrence of flare.

Figure 5:
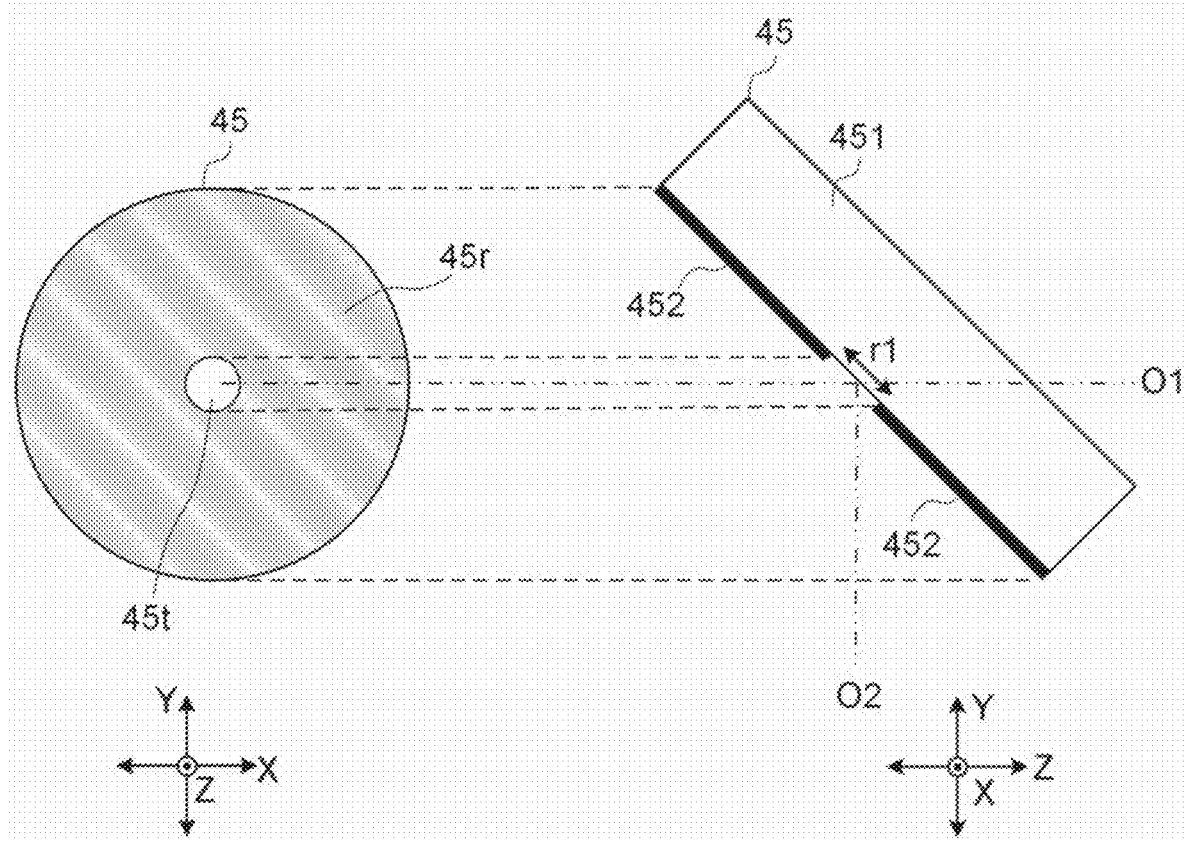
FIG. 5 is a schematic diagram for explaining a configuration of the perforated mirror according to the first embodiment.

In contrast, in the first embodiment, the perforated mirror 45 is formed as shown in FIG. 5.

FIG. 5 shows a schematic diagram of a configuration of the perforated mirror 45 according to the first embodiment. FIG. 5 schematically represents a front view of the perforated mirror 45 when viewed from the optical axis O1 of the imaging optical system 40 and a side view of the perforated mirror 45 corresponding to the front view.

The perforated mirror 45 includes a transparent member 451 as a base substance. On a surface of the transparent member 451, a transmission region 45t and a reflective region 45r are formed. The transparent member 451 is an optical member having a permeability. The surface of such the transparent member 451 is the transmission region 45t, and the reflective region 45r is formed by evaporating a reflective film 452 onto a part of the transmission region 45t on the surface of the transparent member 451.

When the position matching of the optical system relative to the subject's eye E is completed, the transmission region 45t is arranged at a position substantially conjugate optically to the iris of the subject's eye E. In this case, the optical axis O1 of the imaging optical system 40 and the optical axis O2 of the illumination optical system 20, the optical axis O2 intersecting the optical axis O1, pass through the transmission region 45t. The illumination light is guided along the optical axis O2, is reflected on the reflective region 45r on which the reflective film 452 is formed, and is guided to the subject's eye E. The returning light of the illumination light from the subject's eye E converges at the transmission region 45t, is transmitted through the transparent member 451, and is guided to the imaging optical system 40.

The reflective film 452 may be a metal film or a dielectric multi-layer film. The reflective film 452 is formed by evaporating (mirror-depositing) the metal film onto the surface of the transparent member 451, or is formed by evaporating the dielectric substance on multiple layers on the surface of the transparent member 451. The transparent member 451 may be a transparent glass member, a transparent plastic member, or the like.

The reflective region 45r is formed on the surface of the transparent member 451 so that the transmission region 45t has an elliptical shape with an aperture diameter rl in the Y-Z cross section, in order to obtain the shape of a precise circle when seen from the direction of the optical axis O1 of the imaging optical system 40. In this case, the transmission region 451 functions as the aperture (opening) of the imaging aperture and limits the light amount of the returning light of the illumination light from the subject's eye E that is guided to the image sensor 51.

Since the reflective region 45r in the perforated mirror 45 is formed by evaporating the reflective film 452, the thickness of the reflective film 452 in the direction along the optical path of transmitted light (returning light of the illumination light) can be virtually eliminated in the optical path of the transmitted light transmitted through the transmission region 45t. This makes it possible to suppress the occurrence of flare, without guiding the reflected light of the transmitted light caused by the structure of the perforated mirror 45, such as the reflected light caused by transmitted light shining on the convex portions 49A and 49B in FIG. 4, to the imaging optical system 40.

[Configuration of Control System]

Figure 6:
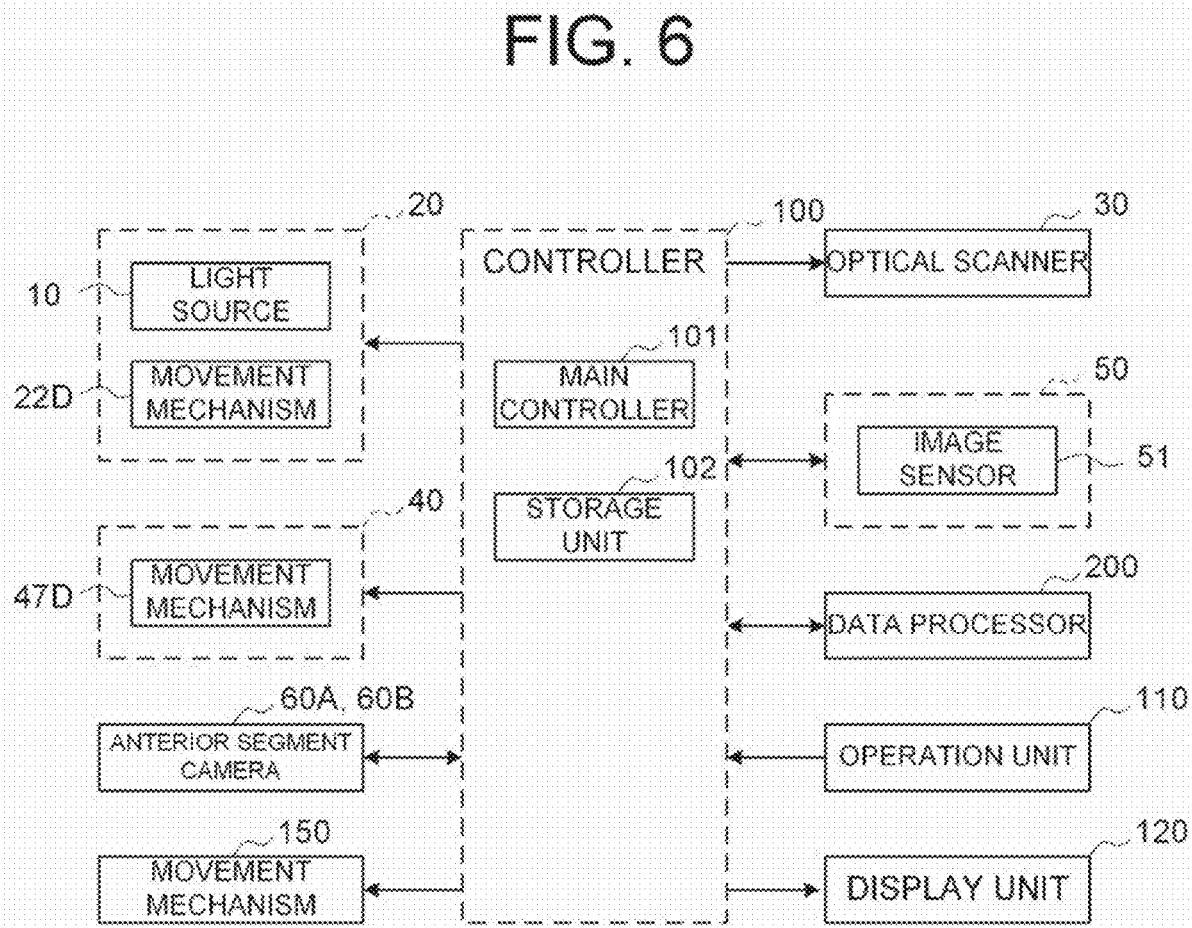
FIG. 6 is a functional block diagram illustrating an example of a configuration of a control system of the ophthalmic apparatus according to the first embodiment.

FIG. 6 shows a block diagram of an example of a configuration of a control system of the ophthalmic apparatus 1 according to the first embodiment. In FIG. 6, like reference numerals designate like parts as in FIG. 1, and the redundant explanation may be omitted as appropriate.

The control system (processing system) of the ophthalmic apparatus 1 is configured with the controller 100 as a center. It should be noted that at least a part of the configuration of the control system may be included in the ophthalmic apparatus 1.

(Controller 100)

The controller 100 controls each part of the ophthalmic apparatus 1. The controller 100 includes a main controller 101 and a storage unit 102. The main controller 101 includes a processor and executes the control processing of each part of the ophthalmic apparatus 1 by executing processing according to the program(s) stored in the storage unit 102.

(Main Controller 101)

The main controller 101 performs control for the illumination optical system 20 including the light source 10, control for the optical scanner 30, control for the imaging optical system 40, control for the imaging device 50, control for the anterior segment cameras 60A and 60B, control for the movement mechanism 150, and control for the data processor 200.

Examples of the control for the illumination optical system 20 include control for the light source 10 and control for the movement mechanism 22D.

Examples of the control for the light source 10 include switching the light source on and off (or switching the wavelength region of the light), and changing the light amount of the light source. In the case that the light source 10 can change the central wavelength of the emitted light, examples of the control for the light source 10 further include change control of the central wavelength of the emitted light.

In some embodiments, the main controller 101 controls a movement mechanism (not shown) that changes at least one of the position of the light source 10 or the orientation of the light source 10 to change at least one of a relative position of the light source 10 to the iris aperture 21 and the slit 22, and a relative orientation of the light source 10 to the iris aperture 21 and the slit 22.

The movement mechanism 22D includes an actuator, and moves the slit 22 in the optical axis direction of the illumination optical system 20 under the control from the main controller 101. The main controller 101 controls the movement mechanism 22D in accordance with the state of the subject's eye E to arrange the slit 22 at the position corresponding to the state of the subject's eye E. Examples of the state of the subject's eye E include a shape of the fundus Ef, a dioptric power (diopter scale), and an axial length. The dioptric power, for example, can be identified from the position on the optical axis of the focusing lens 47 when it is determined to be in the focused state by the focus control using the focus indicator optical system and the focusing lens 47. Alternatively, the dioptric power can be acquired from a known eye refractive power measurement apparatus as disclosed in Japanese Unexamined Patent Application No. 61-293430 or Japanese Unexamined Patent Application Publication No. 2010-259495, for example. The axial length can be obtained from a known axial length measurement apparatus or a measurement value acquired by an optical coherence tomography.

For example, the storage unit 102 stores first control information. In the first control information, the positions of the slit 22 on the optical axis of the illumination optical system 20 are associated with the dioptric powers in advance. The main controller 101 identifies the position of the slit 22 corresponding to the dioptric power by referring to the first control information, and controls the movement mechanism 22D so as to arrange the slit 22 at the identified position.

Here, as the slit 22 moves, the light amount distribution of the light passing through the aperture formed in the slit 22 changes. In this case, as described above, the main controller 101 can control the movement mechanism to change at least one of the position of the light source 10 or the orientation of the light source 10.

Examples of the control for the optical scanner 30 include a control of the scan range (scan start position and scan end position), the scan speed, and the deflection operation. Examples of the deflection operation include one-dimensional and two-dimensional deflection operations.

Examples of the control for the imaging optical system 40 include control for a movement mechanism 47D (focus control). The movement mechanism 47D includes an actuator, and moves the focusing lens 47 in the optical axis direction of the imaging optical system 40, under the control from the main controller 101. The main controller 101 can control the movement mechanism 47D based on an analysis result of the image acquired using the image sensor 51. For example, when performing focus adjustment, the main controller 101 controls the focus indicator optical system to project split indicator light as the focus indicator light onto the fundus Ef of the subject's eye E, identifies the two split indicator images depicted in the image acquired using the image sensor 51, and controls the movement mechanism 47D according to the Schemer principle from the positional relationship between the identified two split indicator images. In some embodiments, without using the focus indicator optical system, the main controller 101 analyzes the image acquired using the image sensor 51 to identify whether or not it is in the focused state, and controls the movement mechanism 47D according to the identified focused state. Further, the main controller 101 can control the movement mechanism 47D based on an operation content of the user using an operation unit 110 described below.

Examples of the control for the imaging device 50 include control for the image sensor 51 (rolling shutter control). Examples of the control for the image sensor 51 include the reset control, the exposure control, the charge transfer control, and the output control. Further, time required for the reset control, time (exposure time) required for the exposure control, time required for the charge transfer control, and time required for the output control, etc., can be changed.

When the ophthalmic apparatus 1 is provided with the focus indicator optical system, the main controller 101 can control the focus indicator optical system. Examples of the control for the focus indicator optical system include control for the focus indicator light source, and control for coupling the optical path from the focus indicator optical system with the optical path of the illumination optical system 20.

Examples of the control for the anterior segment cameras 60A and 60B include control for light receiving sensitivity of each camera, control for the frame rate (light receiving timing), and synchronization control of the anterior segment cameras 60A and 60B.

The movement mechanism 150 three-dimensionally moves at least the optical system of the apparatus of the ophthalmic apparatus 1 (illumination optical system 20 and the imaging optical system 40), for example. In a typical example, the movement mechanism 150 includes a mechanism for moving at least the optical system (body for housing the optical system) in the X direction (left-right direction), a mechanism for moving it in the Y direction (up-down direction), and a mechanism for moving it in the Z direction (depth direction, front-back direction, working distance direction). The mechanism for moving in the X direction includes an X stage movable in the X direction and an X movement mechanism for moving the X stage, for example. The mechanism for moving in the Y direction includes a Y stage movable in the Y direction and a Y movement mechanism for moving the Y stage, for example. The mechanism for moving in the Z direction includes a Z stage movable in the Z direction and a Z movement mechanism for moving the Z stage, for example. Each movement mechanism includes a pulse motor as an actuator and operates under the control from the main controller 101.

The control for the movement mechanism 150 is used for alignment and tracking. Here, tracking is to move the optical system of the apparatus according to the movement of the subject's eye E. To perform tracking, alignment and focus adjustment are performed in advance. The tracking is a function of maintaining a suitable positional relationship in which alignment and focusing are matched by causing the position of the optical system of the apparatus and the like to follow the eye movement.

In the case of manual alignment, a user operates the operation unit 110 to relatively move the optical system and subject's eye E so as to cancel the displacement of the subject's eye E relative to the optical system. For example, the main controller 101 controls the movement mechanism 150 to relatively move the optical system with respect to the subject's eye E, by outputting a control signal corresponding to the operation content for the operation unit 110 to the movement mechanism 150.

In the case of automatic alignment, the main controller 101 controls the movement mechanism 150 to relatively move the optical system relative to the subject's eye E so as to cancel the displacement of the subject's eye E relative to the optical system. Specifically, the main controller 101 performs arithmetic processing using a trigonometry based on the positional relationship between the anterior segment cameras 60A and 60B and the subject's eye E, and controls the movement mechanism 150 so that the positional relationship of the subject's eye E relative to the optical system becomes a predetermined relationship, as described in Japanese Unexamined Patent Application Publication No. 2013-248376.

Examples of the control for the data processor 200 include various kinds of image processing and various kinds of analysis processing on the light receiving results acquired from the image sensor 51. Examples of the image processing include noise removal processing on the light receiving results, brightness correction processing for easily identifying a predetermined site depicted in the light receiving image based on the light receiving results. Examples of the analysis processing include the identification processing of the split indicator images for the focus control described above, the identification processing of the control result for the focusing lens 47 (movement mechanism 47D) according to the Scheiner principle, and the identification processing of the focused state. Examples of the identification processing of the control result for the focusing lens 47 include the identification processing of the position on the optical axis of the focusing lens 47. Examples of the identification processing of the focused state include the identification processing of the control result for the focusing lens 47 based on the image contrast, and the identification processing of the control result for the focusing lens 47 based on the brightness in the brightest region in the image.

The data processor 200 can form the light receiving image corresponding to the arbitrary opening range based on the light receiving result(s) read out from the image sensor 51 using the rolling shutter method, under the control from the main controller 101 (controller 100). The data processor 200 can sequentially form light receiving light images corresponding to the opening ranges and can form an image of the subject's eye E from a plurality of formed light receiving images.

The data processor 200 includes a processor, and realizes the above functions by performing processing corresponding to the program(s) stored in the storage unit or the like.
(Storage Unit 102)

The storage unit 102 stores various computer programs and data. The computer programs include an arithmetic program and a control program for controlling the ophthalmic apparatus 1.
(Operation Unit 110)

The operation unit 110 includes an operation device or an input device. The operation unit 110 includes buttons and switches (e.g., operation handle, operation knob, etc.) and operation devices (e.g., mouse, keyboard, etc.) provided in the ophthalmic apparatus 1. In addition, the operation unit 110 may include any operation device or any input device, such as a trackball, a control panel, a switch, a button, a dial, etc.
(Display Unit 120)

The display unit 120 displays the image of the subject's eye E generated by data processor 200. The display unit 120 is configured to include a display device such as a flat panel display such as an LCD (Liquid Crystal Display). In addition, the display unit 120 may include various types of display devices such as a touch panel and the like provided in the body of the ophthalmic apparatus 1.

It should be noted that the operation unit 110 and the display unit 120 do not need to be configured to be separate devices. For example, a device like a touch panel, which has a display function integrated with an operation function, can be used. In this case, the operation unit 110 includes the touch panel and a computer program. The operation content for the operation unit 110 is fed to the controller 100 as electrical signal(s). Moreover, operations and inputs of information may be performed using a graphical user interface (GUI) displayed on the display unit 120 and the operation unit 110. In some embodiments, the functions of the display unit 120 and the operation unit 110 are realized a touch screen.

FIG. 7 shows a functional block diagram of an example of the configuration of the data processor 200.

The data processor 200 includes a pupil region identifying unit 210, a three-dimensional position calculator 220, an alignment reference position identifying unit 230, and a luminance gradient correction unit 240.
(Pupil Region Identifying Unit 210)

The pupil region identifying unit 210 identifies a pupil region (center position, position of the center of gravity) in the anterior segment image corresponding to the pupil of the anterior segment Ea, by analyzing each of a pair of the anterior segment images (photographic images) obtained by the anterior segment cameras 60A and 60B.

First, the pupil region identifying unit 210 identifies the image region (pupil region) corresponding to the pupil of the subject's eye E based on the distribution of pixel values (luminance values etc.) in the anterior segment image. Generally, the pupil is represented with lower luminance compared to other sites, and therefore, the pupil region may be identified by searching an image region with low luminance. In this case, the pupil region may be identified by taking the shape of the pupil into consideration. That is, it is possible to configure such that the pupil region is identified by searching for a substantially circular image region with low luminance.

Next, the pupil region identifying unit 210 identifies the center position of the identified pupil region. As described above, the pupil is substantially circular, therefore, it is possible to identify the contour of the pupil region, to identify the center position of this contour (an approximate circle or an approximate ellipse thereof), and to treat this as the pupil center position. Instead, by obtaining the center of gravity of the pupil region, this position may be used as the position of the center of gravity of the pupil.

The pupil region identifying unit 210 can sequentially identify the pupil regions corresponding to the pupil for the pair of the anterior segment images sequentially obtained by the anterior segment cameras 60A and 60B. Moreover, the pupil region identifying unit 210 may identify the pupil regions every one or more arbitrary number of frames for the pair of the anterior segment images sequentially obtained by the anterior segment cameras 60A and 60B.

(Three-Dimensional Position Calculator 220)

The three-dimensional position calculator 220 calculates a three-dimensional position of the pupil based on the positions of the anterior segment cameras 60A and 60B and the pupil region (center position) identified by the pupil region identifying unit 210. The three-dimensional position calculator 220 calculates the three-dimensional position of the pupil region of the subject's eye E by applying a known trigonometry to the positions of the two anterior segment cameras 60A and 60B (these are known) and the position corresponding to the pupil region in the pair of the anterior segment images, as disclosed in Japanese Unexamined Patent Application Publication No. 2013-248376.

(Alignment Reference Position Identifying Unit 230)

The alignment reference position identifying unit 230 identifies an alignment reference position (Xr, Yr, Zr) on the optical axis of the imaging optical system 40 for the optical system (imaging optical system 40) in the ophthalmic apparatus 1. The alignment reference position (Xr, Yr, Zr) is a three-dimensional position defined in a three-dimensional coordinate system with the origin at a predetermined reference position in the optical system of the ophthalmic apparatus 1. The coordinate position Xr in the X direction and the coordinate position Yr in the Y direction of the alignment reference position are the positions on the X-Y plane where the optical axis of the imaging optical system 40 coincides with the axis of the subject's eye E. The coordinate position Zr in the Z direction of the alignment reference position is the position on the optical axis of the imaging optical system 40 where the distance from the imaging optical system 40 to the subject's eye becomes a predetermined working distance. Here, the working distance is a preset value which is called a working distance of the objective lens 46, and it means the distance between the subject's eye E and the optical system when measuring (imaging) using the imaging optical system 40.

Examples of the alignment reference position include a corneal apex position of the subject's eye E. In this case, the alignment reference position identifying unit 230 can identify the alignment reference position based on the three-dimensional position of the pupil region identified by the three-dimensional position calculator 220 and intraocular parameter(s). Examples of the intraocular parameter(s) include a distance in the optical axis direction of the imaging optical system 40 from the corneal apex position to the pupil. The distance in the optical axis direction of the imaging optical system 40 from the corneal apex position to the pupil may be a value calculated from parameter of a known schematic eye, or may be a measured value of the subject's eye E. The alignment reference position identifying unit 230 can obtain the alignment reference position from the three-dimensional position of the pupil region calculated by the three-dimensional position calculator 220, using the intraocular parameter representing the distance in the optical axis direction of the imaging optical system 40 from the corneal apex position to the pupil.

(Luminance Gradient Correction Unit 240)

The luminance gradient correction unit 240 corrects a luminance gradient of the image (fundus image) of the subject's eye E acquired by the image sensor 51. The luminance gradient correction unit 240 can correct the luminance gradient of the image of the subject's eye E so as to cancel the asymmetry of the vignetting of the imaging aperture (opening) in accordance with an imaging angle of field caused by the tilted arrangement of the transmission region 45t on the surface of the perforated mirror 45 relative to the optical axis O1 of the imaging optical system 40. Specifically, the transmission region (surface of the transparent member) is arranged to be tilted in the Y direction (first direction), which is perpendicular to the optical axis of the objective lens 46 (optical axis O1 of the imaging optical system 40). More specifically, the transmission region is arranged to be tilted so as to include a normal line of the surface of the transparent member in a plane including the Y direction. In this case, the luminance gradient correction unit 240 corrects the luminance gradient in the Y direction of the photographic image acquired by the imaging device 50.

FIG. 8 shows a schematic diagram describing an operation of the luminance gradient correction unit 240 according to the first embodiment. FIG. 8 schematically represents the returning light of the illumination light from the fundus Ef of the subject's eye E entering the perforated mirror 45 in the Y-Z cross section. In FIG. 8, like reference numerals designate like parts as in FIG. 1 or FIG. 5. The same description may not be repeated.

The illumination light refracted by the objective lens 46 illuminates a predetermined range on the fundus Ef. The returning light of the illumination light from the fundus Ef travels through the objective lens 46 depending on the imaging angle of field, and is transmitted through the transmission region formed in the perforated mirror 45. In this case, the transmission region (imaging aperture diaphragm) formed in the perforated mirror 45 is arranged at an angle relative to the optical axis O1 of the imaging optical system 40. Therefore, for example, following three vignettings are not uniform. Here, one of the three vignettings is a vignetting when the light beam L1 of the returning light from a lower site in the Y direction of the fundus Ef passes through the transmission region. The other vignetting is a vignetting when the light beam L0 of the returning light from a site of the fundus Ef on the optical axis O1 of the imaging optical system 40 passes through the transmission region. The remain one is a vignetting when the light beam L2 of the returning light from the upper site in the Y direction of the fundus Ef passes through the transmission region. In other words, the light amount of the transmitted light transmitted through the transmission region varies along the Y direction. As a result, the image of the subject's eye E formed by the transmitted light whose light amount varies along the Y direction has a luminance gradient in the Y direction (i.e., in one direction).

Figure 9:
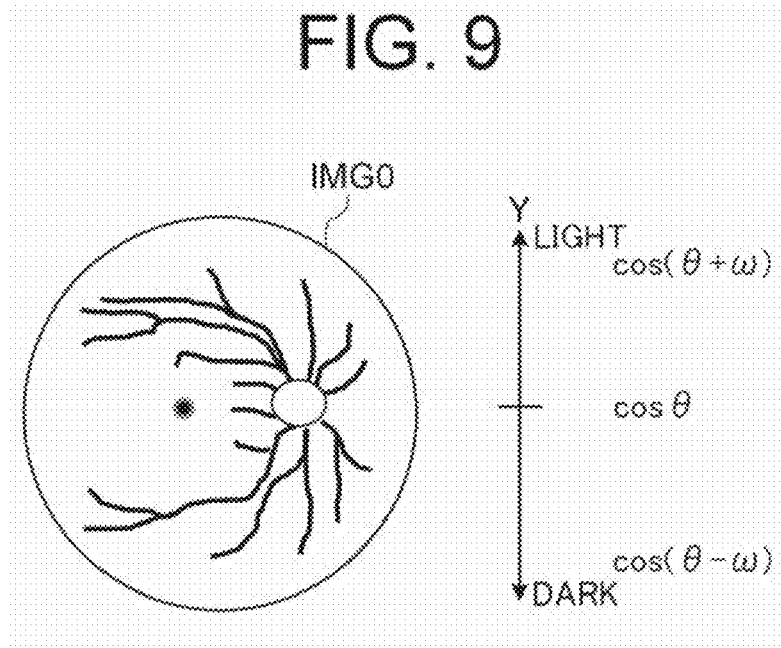
FIG. 9 is a schematic diagram for explaining an operation of the ophthalmic apparatus according to the first embodiment.

FIG. 9 schematically shows a photographic image of the fundus Ef acquired using the image sensor 51.

In the first embodiment, the photographic image IMG0 of the fundus Ef acquired using the image sensor 51 has a luminance gradient that becomes lighter from the lower part to the upper part in the Y direction. A tilt angle of the transmission region relative to the optical axis O1 of the imaging optical system 40 is θ (0<θ<90 degrees), and an incident angle at which the returning light relative to the optical axis O1 enters the transmission region is ω (i.e., the imaging angle of field) (0≤|ω|<(90−θ) degrees). In this case, the photographic image IMG0 has a luminance gradient based on the tilt angle θ and the incident angle ω with reference to the optical axis O1 of the imaging optical system 40.

Therefore, the luminance gradient correction unit 240 corrects the luminance gradient in the photographic image IMG0 based on the tilt angle θ of the transmission region relative to the optical axis O1 and the incident angle ω at which the returning light entering the transmission region relative to the optical axis O1.

Specifically, when the pixel position corresponding to the optical axis O1 of the imaging optical system 40 that corresponds to the light beam L0 in the photographic image IMG0 is regarded as a reference, the level of light at the pixel position on the optical axis O1 corresponding to light beam L0 (incident angle=0) is (cos θ) times lower than the level of light when the transmission region is orthogonal to the optical axis O1. Similarly, the level of light is (cos(θ−ω)) times lower in the Y direction corresponding to light beam L1 (incident angle=−ω), and the level of light is (cos(θ+ω))) times lower in the Y direction corresponding to light beam L2 (incident angle=+ω).

In this case, the luminance gradient correction unit 240 corrects the luminance gradient by multiplying respective luminance values of a plurality of pixels in the Y direction (luminance gradient direction) composing the photographic image IMG0 by (1/cos(θ+ω)) in accordance with the incident angle. Specifically, the luminance gradient correction unit 240 multiplies the luminance value of the pixel of the optical axis O1 corresponding to the light beam L0 among the plurality of pixels in the Y direction (luminance gradient direction) by (1/cos θ), multiplies the luminance value of the pixel corresponding to the light beam L1 by (1/cos(θ−ω)), and multiplies the luminance value of the pixel corresponding to the light beam L2 by (1/cos(θ+ω)).

(Other Configurations)

In some embodiments, the ophthalmic apparatus 1 further includes a fixation projection system. For example, an optical path of the fixation projection system is coupled with the optical path of the imaging optical system 40 in the configuration of the optical system shown in FIG. 1. The fixation projection system can present internal fixation targets or external fixation targets to the subject's eye E. In case of presenting the internal fixation target to the subject's eye E, the fixation projection system includes an LCD that displays the internal fixation target under the control from the controller 100, and projects a fixation light flux output from the LCD onto the fundus Ef of the subject's eye E. The LCD is configured to be capable of changing the display position of the fixation target on the screen of the LCD. By changing the display position of the fixation target on the screen of the LCD, the projected position of the fixation target on the fundus of the subject's eye E can be changed. The display position of the fixation target on the LCD can be designated using the operation unit 110 by the user.

[Operation]

Next, the operation of the ophthalmic apparatus 1 will be described.

Figure 10:
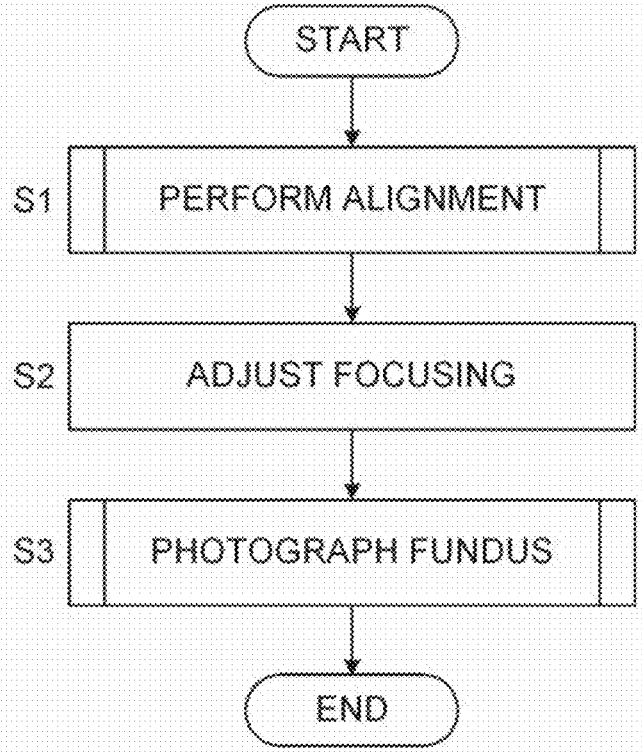
FIG. 10 is a flow chart illustrating an example of an operation of the ophthalmic apparatus according to the first embodiment.
Figure 11:
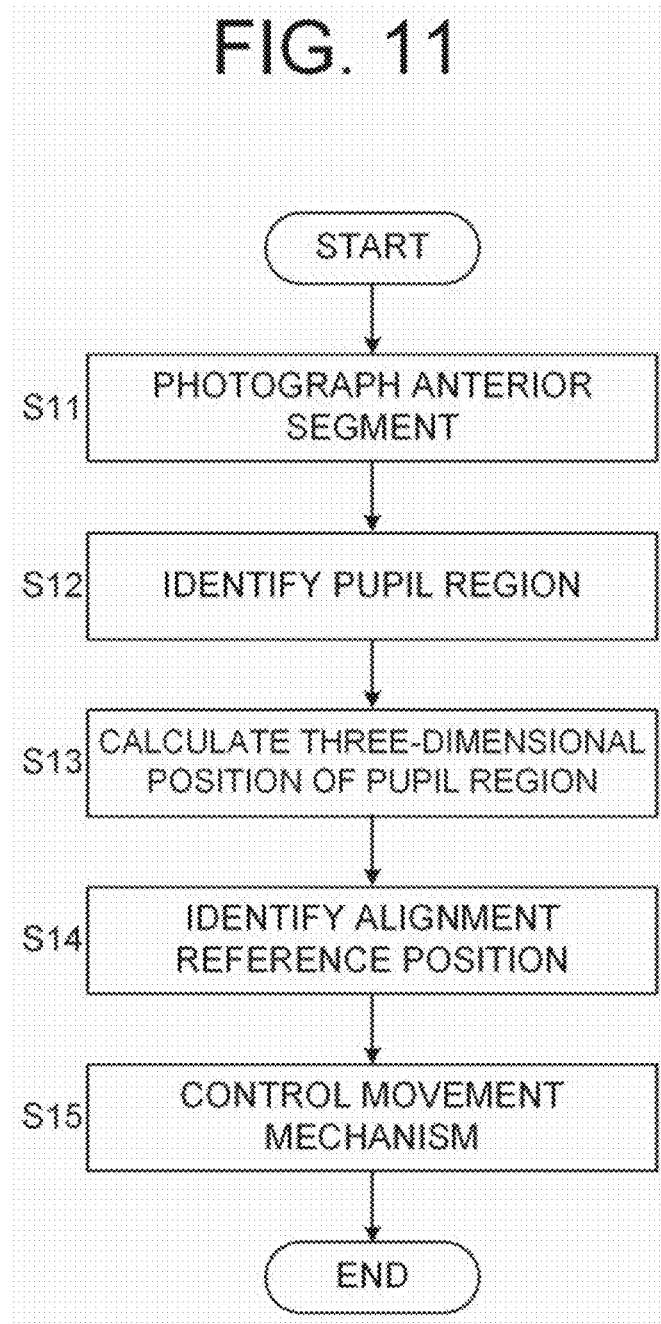
FIG. 11 is a flow chart illustrating an example of an operation of the ophthalmic apparatus according to the first embodiment.
Figure 12:
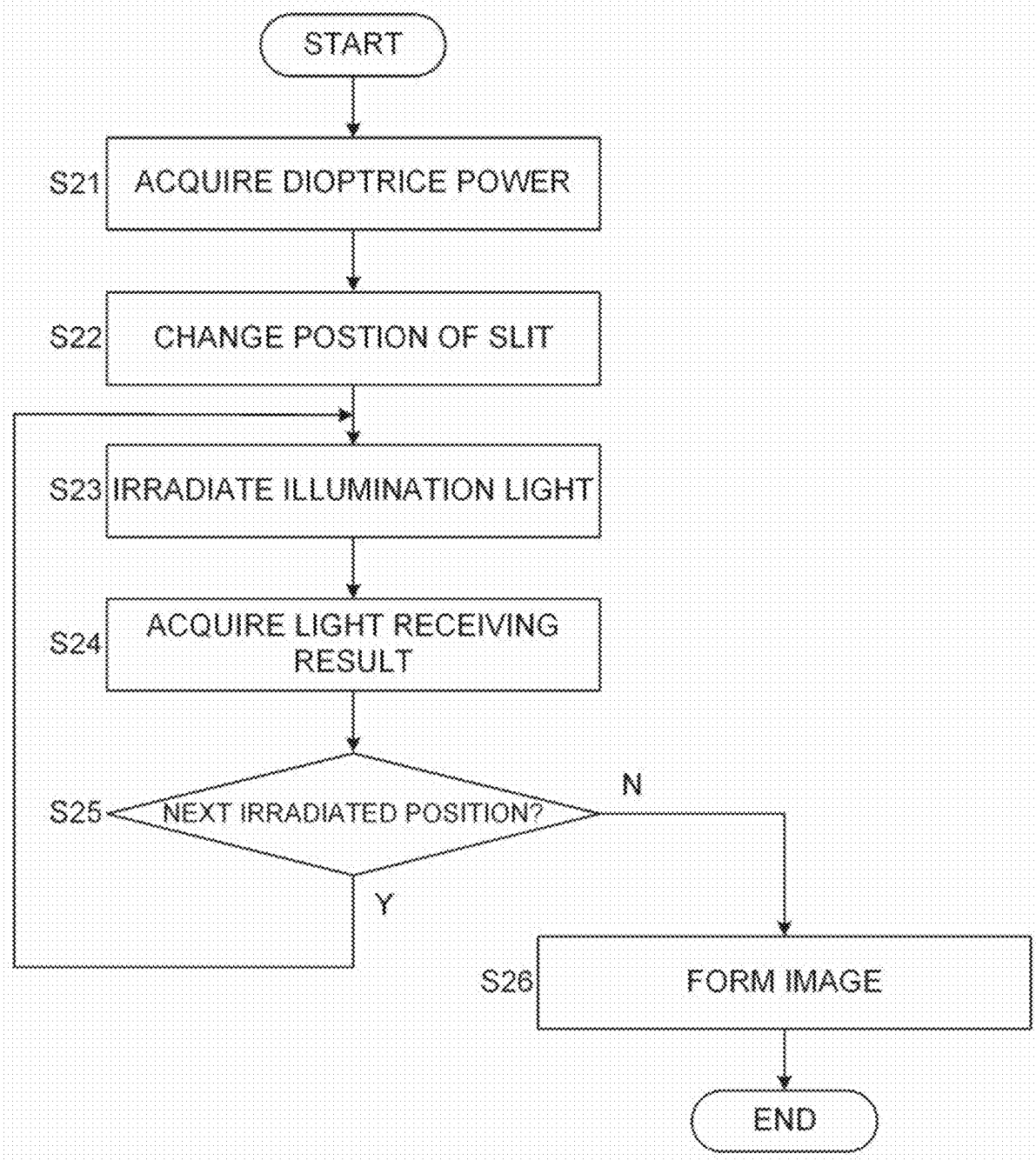
FIG. 12 is a flow chart illustrating an example of an operation of the ophthalmic apparatus according to the first embodiment.

FIGS. 10 to 12 show flow charts of examples of the operation of the ophthalmic apparatus 1 according to the first embodiment. The storage unit 102 stores computer programs for realizing the processing shown in FIGS. 10 to 12. The main controller 101 operates according to the computer programs, and thereby the main controller 101 performs the processing shown in FIGS. 10 to 12.

FIG. 10 represents a flow chart of an example of the operation of the ophthalmic apparatus 1. FIG. 11 shows a flow chart of an example of the operation of step S1 in FIG. 10. FIG. 12 shows a flow chart of an example of the operation of step S3 in FIG. 10.

(S1: Perform Alignment)

First, the main controller 101 performs alignment. When the position matching of the optical system relative to the subject's eye E is completed, the transmission region of the perforated mirror 45 is arranged at a position substantially conjugate optically to the iris of the subject's eye E. The details of step S1 will be described below.

(S2: Adjust focusing)

Next, the main controller 101 controls the movement mechanism 47D to move the focusing lens 47 in the optical axis direction to perform focus adjustment.

For example, the main controller 101 controls the focus indicator optical system not shown in the figure to project the split indicator light as the focus indicator light onto the fundus Ef of the subject's eye E. And then, the main controller 101 controls the data processor 200 to identify the two split indicator images depicted in the image acquired using the image sensor 51. The main controller 101 controls the movement mechanism 47D according to the Scheiner principle from the positional relationship between the identified two split indicator images.

For example, without using the focus indicator optical system, the main controller 101 may control the data processor 200 to analyze the image acquired using the image sensor 51 to identify the focused state. In this case, the main controller 101 controls the movement mechanism 47D in accordance with the identified focused state.

For example, the user may operate the operation unit 110 to change the focused state while referring to the fundus image displayed on the display unit 120. In this case, the main controller 101 controls the movement mechanism 47D based on the operation content of the user using the operation unit 110.

(S3: Photograph Fundus)

Next, the main controller 101 controls the illumination optical system 20, the optical scanner 30, the imaging optical system 40, and the imaging device 50 to photograph the fundus Ef of the subject's eye E. and acquires the fundus image. The details of step S3 will be described below.

This terminates the operation of the ophthalmic apparatus 1 (END).

Step S1 in FIG. 10 is performed according to the flow shown in FIG. 11.

(S11: Photograph Anterior Segment)

First, the main controller 101 controls the anterior segment cameras 60A and 60B to start photographing the anterior segment Ea of the subject's eye E from different directions, and starts acquiring a pair of anterior segment images acquired substantially simultaneously.

(S12: Identify Pupil Region)

Next, the main controller 101 controls the pupil region identifying unit 210 to identify the pupil region for each of the pair of anterior segment images acquired in step S11.

(S13: Calculate three-dimensional position of pupil region)

Next, the main controller 101 controls the three-dimensional position calculator 220 to calculate the three-dimensional position of the pupil region using the pupil regions of the pair of anterior eye images identified in step S12.

(S14: Identify Alignment Reference Position)

Subsequently, the main controller 101 controls the alignment reference position identifying unit 230 to identify the corneal apex position as the alignment reference position from the three-dimensional position of the pupil region calculated in step S13 and the intraocular parameter(s).

(S15: Control Movement Mechanism)

Next, the main controller 101 controls the movement mechanism 150 to arrange the subject's eye E at the alignment target position calculated in step S14.

This terminates the processing of step S1 in FIG. 10 (END).

Step S3 in FIG. 10 is performed according to the flow shown in FIG. 12.

(S21: Acquire Dioptric Power)

First, the main controller 101 acquires the dioptric power. For example, the main controller 101 identifies the dioptric power from the position on the optical axis of the focusing lens 47 having been set to the focused state (or the control result for the actuator that moves the movement mechanism 47D). The main controller 101 may acquire the dioptric power of the subject's eye E from the external ophthalmic measurement apparatus or the electronic medical record.

(S22: Change Position of Slit)

Next, the main controller 101 changes the position of the slit 22 on the optical axis of the illumination optical system 20 in accordance with the dioptric power of the subject's eye E acquired in step S21.

Specifically, the main controller 101 specifies the position of the slit 22 corresponding to the dioptric power by referring to the first control information stored in the storage unit 102, and controls the movement mechanism 22D so as to arrange the slit 22 at the identified position.

(S23: Irradiate Illumination Light)

Next, the main controller 101 controls the illumination optical system 20 to generate the slit-shaped illumination light, and to start the deflection control of the optical scanner 30 to start irradiating the illumination light onto a desired irradiated region on the fundus Ef. When the irradiation of the illumination light is started, the slit-shaped illumination light is sequentially irradiated within the desired irradiated range as described above.

(S24: Acquire Light Receiving Result)

The main controller 101 acquires the light receiving result(s) of the pixels in the opening range of the image sensor 51 corresponding to the irradiated range of the illumination light on the fundus Ef performed in step S23, as described above.

(S25: Next Irradiated Position?)

The main controller 101 determines whether or not the next irradiated position is to be irradiated with the illumination light. The main controller 101 can determine whether or not the next irradiated position is to be irradiated with the illumination light, by determining whether or not the irradiated range of the illumination light that is moved sequentially has covered a predetermined imaging range of the fundus Ef.

When it is determined that the next irradiated position is to be irradiated with the illumination light (S25: Y), the operation of the ophthalmic apparatus 1 proceeds to step S23. When it is determined that the next irradiated position is not to be irradiated with the illumination light (S25: N), the operation of the ophthalmic apparatus 1 proceeds to step S26.

(S26: Form Fundus Image)

In step S25, when it is determined that the next irradiated position is not to be irradiated with the illumination light (S25: N), the main controller 101 controls the data processor 200 to form the image of the subject's eye E from the light receiving results acquired repeatedly while changing the irradiated range of the illumination light in steps S23 and S24.

For example, the data processor 200 syntheses a plurality of light receiving results with different irradiated ranges (opening ranges on the light receiving surface SR of the image sensor 51) of the illumination light for the number of times repeating the process in steps S23 to S25, based on the order of the movement of the irradiated range. Thereby, the fundus image of the fundus Ef for one frame is formed.

In some embodiments, in step S23, the illumination light is irradiated on the irradiated range set so as to have an overlapping region with the adjacent irradiated range. Thereby, in step S26, the fundus image for one frame is formed by synthesizing the overlapping regions so as to overlap with each other.

This terminates the processing of step S3 in FIG. 10 (END).

It should be noted that the antireflection treatment may be performed on the edge face of the reflective region 45r to suppress the reflection on the edge face in the perforated mirror 45 shown in FIG. 5.

Figure 13:
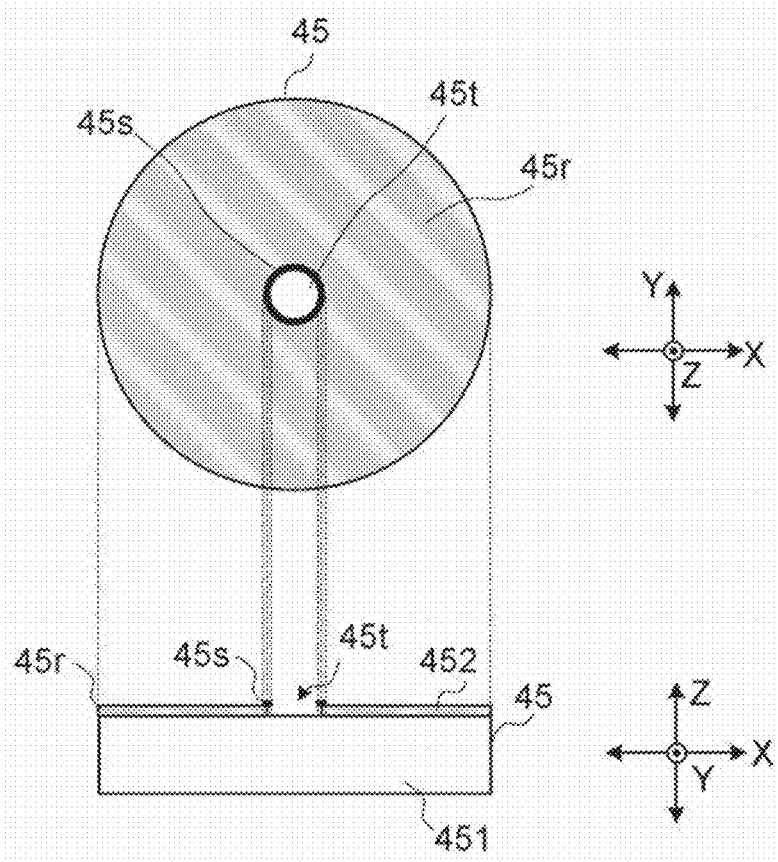
FIG. 13 is a schematic diagram for explaining a configuration of the perforated mirror according to a modification example of the first embodiment.

FIG. 13 shows a schematic diagram of a configuration of the perforated mirror 45 according to a modification example of the first embodiment. FIG. 13 schematically represents a front view of the perforated mirror 45 when viewed from the optical axis direction of the imaging optical system 40 and a section view of the perforated mirror 45 corresponding to the front view. In FIG. 13, like reference numerals designate like parts as in FIG. 5, and the same description may not be repeated.

For example, a black coating treatment can be performed on a boundary between the reflective region 45r and the transmission region 45t which are formed on the surface of the transparent member 451 that constitutes the perforated mirror 45. The black coating treatment is a treatment that covers the boundary between the reflective region 45r and the transmission region 45t with a film 45s of blackening as the antireflective film so as to overlap the reflective region 45r and the transmission region 45t.

As explained above, according to the first embodiment or the modification example thereof, the perforated mirror 45 is formed as the optical path coupling member by forming the reflective film on a part of the transmission region on the surface of the transparent member 451. This allows to minimize the thickness of the reflective film in the transmission direction of the transmitted light that is transmitted through the perforated mirror 45. Therefore, the reflection of the transmitted light at the edge face (edge) of the reflective film of the perforated mirror 45 can be suppressed, and the occurrence of flare caused by the reflected light of the transmitted light being guided to the imaging optical system 40 can be suppressed. As a result, the flare can be reduced while performing pupil division between the illumination optical system and the imaging optical system.

Second Embodiment

In the first embodiment, the case has been described in which the illumination optical system 20 is arranged in the reflection direction of the perforated mirror 45 and the imaging optical system 40 is arranged in the transmission direction of the perforated mirror 45. However, the configuration of the according to the embodiments is not limited thereto. In a second embodiment, the illumination optical system 20 is positioned in the transmission direction of the perforated mirror 45, and the imaging optical system 40 is arranged in the reflection direction of the perforated mirror 45.

Hereinafter, a configuration and an operation of the ophthalmic apparatus according to the second embodiment will be described below mainly about the differences from the first embodiment.

Figure 14:
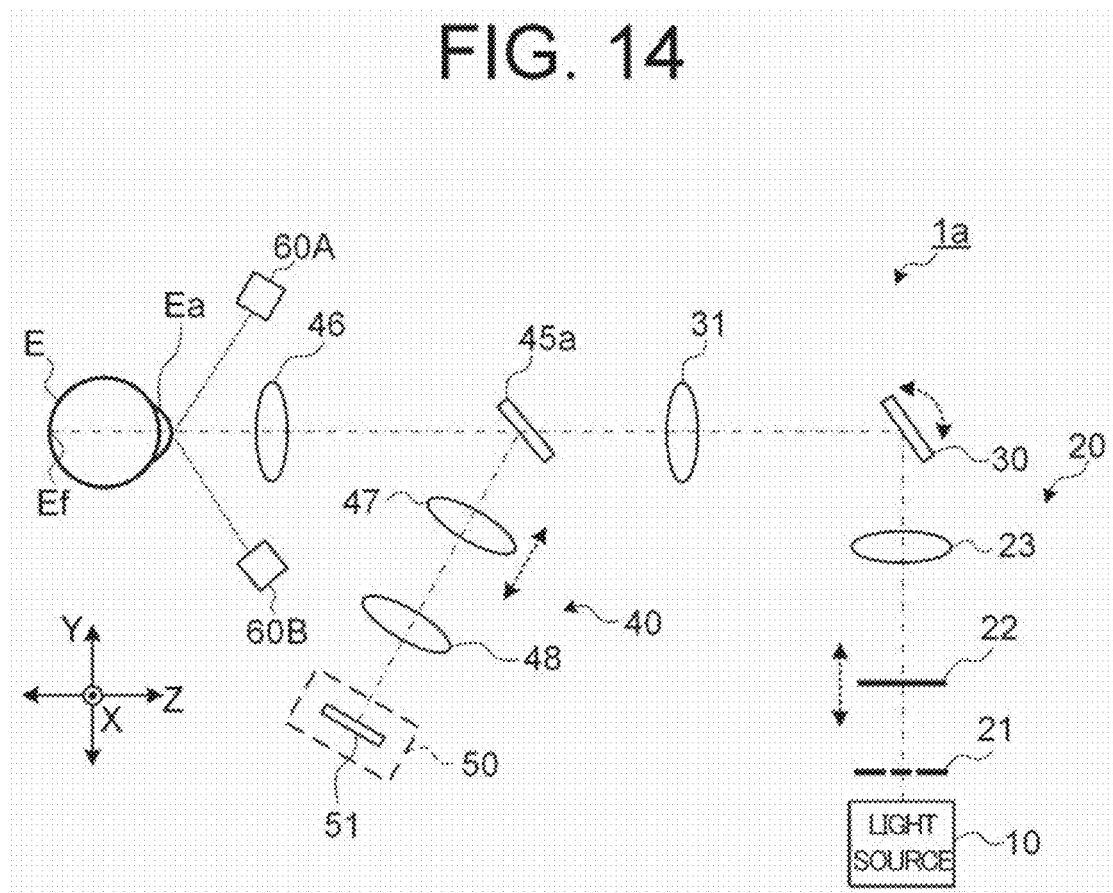
FIG. 14 is a schematic diagram illustrating an example of a configuration of an optical system of the ophthalmic apparatus according to a second embodiment.

FIG. 14 illustrates an example of a configuration of an optical system of the ophthalmic apparatus according to the second embodiment. In FIG. 14, parts similar to those in FIG. 1 are denoted by the same reference symbols, and description thereof is omitted as appropriate.

The configuration of the optical system of the ophthalmic apparatus 1a according to the second embodiment differs from that of the optical system of the ophthalmic apparatus 1 according to the first embodiment in that a perforated mirror 45a is provided instead of the perforated mirror 45, that the illumination optical system 20 is arranged in the transmission direction of the perforated mirror 45a, and that the imaging optical system 40 is arranged in the reflection direction of the perforated mirror 45a.

In the perforated mirror 45a, a reflective region and a transmission region are formed. Here, the reflective region can be arranged at a position substantially conjugate optically to the iris of the subject's eye E. and the transmission region is formed in the peripheral region of the reflective region. The illumination light from the optical scanner 30 (relay lens 31) is transmitted through the transmission region of the perforated mirror 45a and is guided to the objective lens 46. The returning light of the illumination light from the subject's eye E is reflected on the reflective region of the perforated mirror 45a toward the imaging device 50.

That is, the perforated mirror 45a is configured to couple the optical path of the illumination optical system 20 (optical path from the optical scanner 30) and the optical path of the imaging optical system 40 arranged in the opposite direction of the reflection direction of the reflective region, and to reflect the returning light from the fundus Ef, which is illuminated with the illumination light transmitted through the transmission region, on the reflective region to guide to the imaging optical system 40.

In FIG. 14, the surface of the reflective region of the perforated mirror 45a is arranged to be tilted relative to the optical axis of the imaging optical system 40 so that the illumination optical system 20 is arranged in the transmission direction of the perforated mirror 45a and that the imaging optical system 40 is arranged in the reflection direction of the perforated mirror 45a.

FIG. 15 shows a schematic diagram of a configuration of the perforated mirror 45a according to the second embodiment. FIG. 15 schematically represents a front view of the perforated mirror 45a when viewed from the optical axis O1 of the imaging optical system 40 and a side view of the perforated mirror 45a corresponding to the front view.

The perforated mirror 45a includes a transparent member 451 as a base substance. On a surface of the transparent member 451, a transmission region 45t and a reflective region 45r are formed. The surface of such the transparent member 451 is the transmission region 45t, and the reflective region 45r is formed by evaporating a reflective film 452 onto a part of the transmission region 45t on the surface of the transparent member 451.

When the position matching of the optical system relative to the subject's eye E is completed, the reflective region 45r is arranged at a position substantially conjugate optically to the iris of the subject's eye E. In this case, the optical axis O1 of the imaging optical system 40 and the optical axis O2 of the illumination optical system 20, the optical axis O2 intersecting the optical axis O1, pass through the reflective region 45r. The illumination light is guided along the optical axis O2, is transmitted through the transmission region 45t around the reflective region 45r, and is guided to the subject's eye E. The returning light of the illumination light from the subject's eye E converges and is reflected at the reflective region 45r on which the reflective film 452 is formed, and is guided to the imaging optical system 40.

The reflective region 45r having an elliptical shape is formed on the surface of the transparent member 451 so as to obtain the shape of a precise circle when seen from the direction of the optical axis O1 of the imaging optical system 40.

Since the reflective region 45r in the perforated mirror 45a is formed by evaporating the reflective film 452, the thickness of the reflective film 452 in the direction along the optical path of transmitted light (returning light of the illumination light) can be virtually eliminated in the optical path of the transmitted light that is transmitted through the transmission region 45t. This makes it possible to suppress the occurrence of flare, without guiding the reflected light of the transmitted light caused by the structure of the perforated mirror 45, such as the reflected light caused by transmitted light shining on the convex portions 49A and 49B in FIG. 4, to the imaging optical system 40.

The configuration of the control system of the ophthalmic apparatus 1a according to the second embodiment is the same configuration as that of the ophthalmic apparatus 1 according to the first embodiment. Also in the second embodiment, as in the first embodiment, the luminance gradient correction is performed on the photographic images as shown in FIGS. 8 and 9.

The operation of the ophthalmic apparatus 1a according to the second embodiment is similar to the operation of the ophthalmic apparatus 1 according to the first embodiment. Thus, the detailed description of the operation will be omitted.

It should be noted that the antireflection treatment may be performed on the edge face of the reflective region 45r to suppress the reflection on the edge face in the perforated mirror 45a shown in FIG. 15.

FIG. 16 shows a schematic diagram of a configuration of the perforated mirror 45a according to a modification example of the second embodiment. FIG. 16 schematically represents a front view of the perforated mirror 45a when viewed from the optical axis direction of the imaging optical system 40 and a section view of the perforated mirror 45a corresponding to the front view. In FIG. 16, like reference numerals designate like parts as in FIG. 5, FIG. 13, or FIG. 15. The same description may not be repeated.

For example, a black coating treatment can be performed on a boundary between the reflective region 45*r* and the transmission region 45*t* which are formed on the surface of the transparent member 451 that constitutes the perforated mirror 45*a*. The black coating treatment is a treatment that covers the boundary between the reflective region 45*r* and the transmission region 45*t* with a film 45*s* of blackening as the antireflective film so as to overlap the reflective region 45*r* and the transmission region 45*t*.

As explained above, according to the second embodiment or the modification example thereof, the perforated mirror 45*a* is formed as the optical path coupling member by forming the reflective film on a part of the transmission region on the surface of the transparent member 451. Thereby, there is no thickness of the reflective film in the transmission direction of the transmitted light that is transmitted through the perforated mirror 45*a*. Therefore, the reflection of the transmitted light at the edge face (edge) of the reflective film of the perforated mirror 45*a* can be suppressed, and the occurrence of flare caused by the reflected light of the transmitted light being guided to the imaging optical system 40 can be suppressed. As a result, the flare can be reduced while performing pupil division between the illumination optical system and the imaging optical system.

[Actions]

The ophthalmic apparatus and the ophthalmic information processing apparatus according to the embodiments will be described.

The first aspect of some embodiments is an ophthalmic apparatus (1) including an objective lens (46), an illumination optical system (20), an imaging optical system (40), and an optical path coupling member (45). The illumination optical system is configured to illuminate a subject's eye (E) with illumination light via the objective lens. The imaging optical system is configured to guide returning light of the illumination light from the subject's eye to an imaging device (50) via the objective lens. The optical path coupling member has a transparent member (451) with a reflective region (45*r*) formed by evaporating a reflective film (452) onto a part of a transmission region (45*t*) of its surface, and is configured to couple an optical path of the illumination optical system with an optical path of the imaging optical system. The transmission region is configured to be capable of being arranged at a position substantially conjugate optically to an iris of the subject's eye. The illumination optical system and the imaging optical system are arranged so that the illumination light is reflected on the reflective region and the returning light is transmitted through the transmission region.

According to such an aspect, the thickness of the reflective region in the direction along the optical path of the returning light of the illumination light transmitted through the optical path coupling member can be minimized. This allows to suppress the reflection of the transmitted light at the edge face (edge) of the reflective region of the optical path coupling member, and to suppress the occurrence of flare caused by the reflected light of returning light being guided to the imaging optical system. As a result, the flare can be reduced while performing pupil division between the illumination optical system and the imaging optical system.

The second aspect of some embodiments is an ophthalmic apparatus (1*a*) including an objective lens (46), an illumination optical system (20), an imaging optical system (40), and an optical path coupling member (45*a*). The illumination optical system is configured to illuminate a subject's eye (E) with illumination light via the objective lens. The imaging optical system is configured to guide returning light of the illumination light from the subject's eye to an imaging device (50) via the objective lens. The optical path coupling member has a transparent member (451) with a reflective region (45*r*) formed by evaporating a reflective film (452) onto a part of a transmission region (451) of its surface, and is configured to couple an optical path of the illumination optical system with an optical path of the imaging optical system. The reflective region is configured to be capable of being arranged at a position substantially conjugate optically to an iris of the subject's eye. The illumination optical system and the imaging optical system are arranged so that the illumination light is transmitted through the transmission region and the returning light is reflected on the reflective region.

According to such an aspect, the thickness of the reflective region in the direction along the optical path of the returning light of the illumination light transmitted through the optical path coupling member is no longer present. This allows to suppress the reflection of the transmitted light at the edge face (edge) of the reflective region of the optical path coupling member, and to suppress the occurrence of flare caused by the reflected light of returning light being guided to the imaging optical system. As a result, the flare can be reduced while performing pupil division between the illumination optical system and the imaging optical system.

In the third aspect of some embodiments, in the ophthalmic apparatus in the first aspect or the second aspect, an antireflective film is formed so as to cover a boundary between the reflective region and transmission region of the transparent member.

According to such an aspect, the reflection on the edge face of the reflective region can be reliably suppressed.

In the fourth aspect of some embodiments, in the ophthalmic apparatus in any one of the first aspect to the third aspect, the reflective film is a metal film or a dielectric multi-layer film.

According to such an aspect, the optical path coupling member can be manufactured at low cost using existing vapor deposition technology, and the cost reduction of the ophthalmic apparatus capable of reducing flare while performing pupil division between the illumination optical system and the imaging optical system.

In the fifth aspect of some embodiment, the ophthalmic apparatus in any one of the first aspect to the fourth aspect further includes a luminance gradient correction unit (240) configured to correct a luminance gradient in a first direction (Y direction) perpendicular to an optical axis of the objective lens (optical axis O1 of the imaging optical system 40) in a photographic image acquired using the imaging device, when the transmission region on the surface is arranged to be tilted in the first direction.

According to such an aspect, the asymmetry of the vignetting of the imaging aperture in accordance with an imaging angle of field caused by the tilted arrangement of the transmission region relative to the optical axis of objective lens can be canceled. This allows to reduce the degradation of the image quality of the photographic images.

In the sixth aspect of some embodiment, in the ophthalmic apparatus in the fifth aspect, the luminance gradient correction unit is configured to correct the luminance gradient in the photographic image based on a tilt angle (θ) of the transmission region relative to the optical axis and an incident angle (o, imaging angle of field) of the returning light entering the transmission region relative to the optical axis.

According to such an aspect, the asymmetry of the vignetting of the imaging aperture in accordance with an imaging angle of field can be canceled with high precision.

In the seventh aspect of some embodiments, in the ophthalmic apparatus in the fifth aspect or the sixth aspect, when the tilt angle is θ and the incident angle is ω, the luminance gradient correction unit is configured to multiply respective luminance values of a plurality of pixels in a luminance gradient direction (Y direction) composing the photographic image by (1/cos(θ+ω)) in accordance with the incident angle.

According to such an aspect, the asymmetry of the vignetting of the imaging aperture in accordance with an imaging angle of field can be canceled with high precision using a simple processing.

The eighth aspect of some embodiments is an ophthalmic information processing apparatus (data processor 200) including: an acquisition unit (communication unit) configured to acquire a photographic image using an ophthalmic apparatus; and a luminance gradient correction unit (240) configured to correct a luminance gradient in a first direction (Y direction) perpendicular to an optical axis of the objective lens (optical axis O1 of the imaging optical system 40) in the photographic image acquired by the acquisition unit, when the transmission region on the surface is arranged to be tilted in the first direction.

According to such an aspect, the asymmetry of the vignetting of the imaging aperture in accordance with an imaging angle of field caused by the tilted arrangement of the transmission region relative to the optical axis of objective lens can be canceled in the photographic images. Here, the photographic images are acquired by performing pupil division using the optical path coupling member on which the reflective region is formed by evaporating the reflective film onto a part of the transmission region on the surface of the transparent member. This allows to reduce the degradation of the image quality of the photographic images.

In the ninth aspect of some embodiments, in the ophthalmic apparatus in the eighth aspect, the luminance gradient correction unit is configured to correct the luminance gradient in the photographic image based on a tilt angle (θ) of the transmission region relative to the optical axis and an incident angle (ω, imaging angle of field) of the returning light entering the transmission region relative to the optical axis.

According to such an aspect, the asymmetry of the vignetting of the imaging aperture in accordance with an imaging angle of field can be canceled with high precision.

In the tenth aspect of some embodiments, in the ophthalmic apparatus in the ninth aspect, when the tilt angle is θ and the incident angle is w, the luminance gradient correction unit is configured to multiply respective luminance values of a plurality of pixels in a luminance gradient direction composing the photographic image by (1/cos(θ+ω)) in accordance with the incident angle.

According to such an aspect, the asymmetry of the vignetting of the imaging aperture in accordance with an imaging angle of field can be canceled with high precision using a simple processing.

The embodiments or the modification example thereof described above are merely examples for carrying out the present invention. Those who intend to implement the present invention can apply any modification, omission, addition, or the like within the scope of the gist of the present invention.

In the above embodiments, the ophthalmic apparatus may have arbitrary functions adaptable in the field of ophthalmology. Examples of such functions include an axial length measurement function, a tonometry function, an optical coherence tomography (OCT) function, an ultrasonic inspection, and the like. It should be noted that the axial length measurement function is realized by the OCT, etc. Further, the axial length measurement function may be used to measure the axial length of the subject's eye by projecting light onto the subject's eye and detecting the returning light from the fundus while adjusting the position of the optical system in the Z direction (front-back direction) relative to the subject's eye. The intraocular pressure measurement function is realized by the tonometer, etc. The OCT function is realized by the OCT apparatus, etc. The ultrasonic inspection function is realized by the ultrasonic diagnosis apparatus, etc. Further, the present invention can also be applied to an apparatus (multifunctional apparatus) having two or more of such functions.

In some embodiments, a program for causing a computer to execute the method of controlling the ophthalmic apparatus described above is provided. Such a program can be stored in any non-transitory computer-readable recording medium. Examples of the recording medium include a semiconductor memory, an optical disk, a magneto-optical disk (CD-ROM, DVD-RAM, DVD-ROM, MO, etc.), a magnetic storage medium (hard disk, floppy (registered trade mark) disk, ZIP, etc.), and the like. The computer program may be transmitted and received through a network such as the Internet, LAN, etc.

The invention has been described in detail with particular reference to preferred embodiments thereof and examples, but it will be understood that variations and modifications can be effected within the spirit and scope of the invention covered by the claims which may include the phrase "at least one of A. B and C" as an alternative expression that means one or more of A, B and C may be used, contrary to the holding in Superguide v. DIRECTV, 69 USPQ2d 1865 (Fed. Cir. 2004).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ophthalmic apparatus, comprising:
   an objective lens;
   an illumination optical system configured to illuminate a subject's eye with illumination light via the objective lens;
   an imaging optical system configured to guide returning light of the illumination light from the subject's eye to an imaging device via the objective lens; and
   an optical path coupling member having a transparent member with a reflective region formed by evaporating a reflective film onto a part of a transmission region of its surface, and configured to couple an optical path of the illumination optical system with an optical path of the imaging optical system, wherein
   the transmission region is configured to be capable of being arranged at a position substantially conjugate optically to an iris of the subject's eye, and the illumination optical system and the imaging optical system are arranged so that the illumination light is reflected on the reflective region and the returning light is transmitted through the transmission region.

2. The ophthalmic apparatus of claim 1, wherein an antireflective film is formed so as to cover a boundary between the reflective region and the transmission region of the transparent member.

3. The ophthalmic apparatus of claim 1, wherein the reflective film is a metal film or a dielectric multi-layer film.

4. The ophthalmic apparatus of claim 1, further comprising
processing circuitry configured as a luminance gradient correction unit configured to correct a luminance gradient in a first direction perpendicular to an optical axis of the objective lens in a photographic image acquired using the imaging device, when the transmission region on the surface is arranged to be tilted in the first direction.

5. The ophthalmic apparatus of claim 4, wherein the luminance gradient correction unit is configured to correct the luminance gradient in the photographic image based on a tilt angle of the transmission region relative to the optical axis and an incident angle of the returning light entering the transmission region relative to the optical axis.

6. The ophthalmic apparatus of claim 5, wherein when the tilt angle is $\theta$ and the incident angle is $\omega$, the luminance gradient correction unit is configured to multiply respective luminance values of a plurality of pixels in a luminance gradient direction composing the photographic image by $(1/\cos(\theta+\omega))$ in accordance with the incident angle.

7. An ophthalmic information processing apparatus, comprising:
an acquisition unit configured to acquire a photographic image using an ophthalmic apparatus; and
processing circuitry configured as a luminance gradient correction unit configured to correct a luminance gradient in a first direction perpendicular to an optical axis of the objective lens in the photographic image acquired by the acquisition unit, when the transmission region on the surface is arranged to be tilted in the first direction, wherein
the ophthalmic apparatus, comprising:
an objective lens;
an illumination optical system configured to illuminate a subject's eye with illumination light via the objective lens;
an imaging optical system configured to guide returning light of the illumination light from the subject's eye to an imaging device via the objective lens; and
an optical path coupling member having a transparent member with a reflective region formed by evaporating a reflective film onto a part of a transmission region of its surface, and configured to couple an optical path of the illumination optical system with an optical path of the imaging optical system, wherein
the transmission region is configured to be capable of being arranged at a position substantially conjugate optically to an iris of the subject's eye, and
the illumination optical system and the imaging optical system are arranged so that the illumination light is reflected on the reflective region and the returning light is transmitted through the transmission region.

8. The ophthalmic information processing apparatus of claim 7, wherein
the luminance gradient correction unit is configured to correct the luminance gradient in the photographic image based on a tilt angle of the transmission region relative to the optical axis and an incident angle of the returning light entering the transmission region relative to the optical axis.

9. The ophthalmic information processing apparatus of claim 8, wherein
when the tilt angle is $\theta$ and the incident angle is $\omega$, the luminance gradient correction unit is configured to multiply respective luminance values of a plurality of pixels in a luminance gradient direction composing the photographic image by $(1/\cos(\theta+\omega))$ in accordance with the incident angle.

* * * * *